(12) United States Patent
Huang

(10) Patent No.: US 10,724,886 B2
(45) Date of Patent: Jul. 28, 2020

(54) STRATIFIED FLOW MULTIPHASE FLOWMETER

(71) Applicant: SCHLUMBERGER TECHNOLOGY CORPORATION, Sugar Land, TX (US)

(72) Inventor: Songming Huang, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 60 days.

(21) Appl. No.: 15/779,024

(22) PCT Filed: Nov. 22, 2016

(86) PCT No.: PCT/US2016/063212
§ 371 (c)(1),
(2) Date: May 24, 2018

(65) Prior Publication Data
US 2018/0348035 A1    Dec. 6, 2018

(30) Foreign Application Priority Data
Nov. 24, 2015    (GB) .................................. 1520708.7

(51) Int. Cl.
*G01F 1/74* (2006.01)
*G01F 15/18* (2006.01)
(Continued)

(52) U.S. Cl.
CPC ............. *G01F 15/18* (2013.01); *G01F 1/667* (2013.01); *G01F 1/74* (2013.01); *G01F 15/00* (2013.01);
(Continued)

(58) Field of Classification Search
None
See application file for complete search history.

(56) References Cited

U.S. PATENT DOCUMENTS

| 4,435,196 A | 3/1984 | Pielkenrood |
| 4,660,414 A | 4/1987 | Hatton et al. |

(Continued)

FOREIGN PATENT DOCUMENTS

| CN | 2397476 Y | 9/2000 |
| CN | 201788135 U | 4/2011 |

(Continued)

OTHER PUBLICATIONS

Combined Search and Examination Report under Sections 17 and 18(3) of UK Patent Application No. 1520708.7, dated May 23, 2016, 6 pages.
(Continued)

*Primary Examiner* — Harshad R Patel

(57) ABSTRACT

A conditioning accumulator (2) for use in a multiphase flow measurement system. The conditioning accumulator includes a container which has an inflow orifice connected to the end of an inflow pipe and an outflow orifice connected to the end of an outflow vessel. The lowest point of the inflow orifice is positioned at or near the bottom of a sidewall of the container. The outflow orifice is positioned in a sidewall of the container, where the lowest point of the outflow orifice is vertically offset and above the lowest point of the inflow orifice when the container is in an operational orientation. The container includes a phase distributer located next to the inflow orifice adapted to distribute the liquid and gas phases of the incoming flow from the inflow pipe within the container. An exit flow resistance device reduces/resists the outflow of liquid from the container.

20 Claims, 13 Drawing Sheets

(51) Int. Cl.
*G01F 1/66* (2006.01)
*G01F 23/26* (2006.01)
*G01F 23/296* (2006.01)
*G01F 15/00* (2006.01)

(52) U.S. Cl.
CPC ............ *G01F 23/26* (2013.01); *G01F 23/296* (2013.01); *G01F 1/66* (2013.01)

(56) References Cited

U.S. PATENT DOCUMENTS

| | | | |
|---|---|---|---|
| 5,127,272 A | 7/1992 | Dean et al. | |
| 5,396,807 A | 3/1995 | Dowty et al. | |
| 5,561,245 A * | 10/1996 | Georgi | E21B 47/10 324/324 |
| 5,576,495 A | 11/1996 | Vetterick | |
| 5,708,211 A * | 1/1998 | Jepson | F17D 1/005 73/861.04 |
| 6,575,043 B1 | 6/2003 | Huang et al. | |
| 6,758,100 B2 | 7/2004 | Huang | |
| 7,650,799 B2 | 1/2010 | Atkinson et al. | |
| 8,322,228 B2 | 12/2012 | Xie et al. | |
| 8,640,529 B2 | 2/2014 | Sinha | |
| 8,694,270 B2 | 4/2014 | Huang et al. | |
| 8,806,955 B2 | 8/2014 | Wible et al. | |
| 2007/0006640 A1 | 1/2007 | Gysling | |
| 2007/0204750 A1 | 9/2007 | Liu et al. | |
| 2008/0163692 A1 * | 7/2008 | Huang | G01F 1/663 73/627 |
| 2008/0319685 A1 | 12/2008 | Xie et al. | |
| 2009/0090504 A1 * | 4/2009 | Weightman | E21B 43/26 166/250.01 |
| 2009/0139345 A1 | 6/2009 | Xie | |
| 2009/0229556 A1 * | 9/2009 | Delgado | F02M 35/04 123/184.53 |
| 2010/0192703 A1 * | 8/2010 | Huang | G01F 1/66 73/861.28 |
| 2011/0098938 A1 | 4/2011 | Huang et al. | |
| 2011/0112773 A1 * | 5/2011 | Atkinson | G01F 1/002 73/861.04 |
| 2011/0259120 A1 | 10/2011 | Thonstad | |
| 2012/0073540 A1 * | 3/2012 | Gangl | G01N 15/00 123/198 R |
| 2014/0060204 A1 * | 3/2014 | Ahmed | G01F 1/56 73/861.04 |
| 2015/0185062 A1 * | 7/2015 | Ahmad | G01F 1/74 73/861.04 |
| 2018/0356314 A1 | 12/2018 | Lagus | |
| 2019/0032477 A1 * | 1/2019 | Huang | E21B 47/101 |

FOREIGN PATENT DOCUMENTS

| | | |
|---|---|---|
| CN | 104075759 A | 10/2014 |
| EP | 0972171 A1 | 1/2000 |
| GB | 1206294 A | 9/1970 |
| JP | 2014521968 A | 8/2014 |
| NL | 2014629 A | 6/2015 |
| WO | 0111190 A1 | 2/2001 |
| WO | 2007057708 A2 | 5/2007 |
| WO | 2009037434 A1 | 3/2009 |
| WO | 2015153133 A1 | 10/2015 |

OTHER PUBLICATIONS

International Preliminary Report on Patentability of International Patent Application No. PCT/US2016/063212, dated Jun. 7, 2018, 11 pages.
Examination Report under Section 18(3) of UK Patent Application No. 1520708.7, dated Oct. 18, 2018, 3 pages.
Search Report and Written Opinion of International Patent Application No. PCT/US2016/063212, dated Mar. 10, 2017, 15 pages.
First Office Action of Chinese Patent Application No. 21680068691.6, dated Oct. 11, 2019, 25 pages.
Monkhouse, R. S. C. et al., "Flexible interdigital PVDF transducers for the generation of Lamb waves in structures", Ultrasonics, 1997, 35, pp. 489-498.
Combined Search and Examination Report under Sections 17 and 18(3) of UK Patent Application No. 1520706.1, dated May 14, 2016, 5 pages.
Examination Report under Section 18(3) of UK Patent Application No. 1520706.1, dated Oct. 18, 2018, 4 pages.
Search Report and Written Opinion of International Patent Application No. PCT/US2016/063213, dated Mar. 20, 2017, 12 pages.
International Preliminary Report on Patentability of International Patent Application No. PCT/US2016/063213, dated Jun. 7, 2018, 9 pages.
Notice of Allowance in U.S. Appl. No. 15/799,009, dated Feb. 24, 2020, 8 pages.
First Chinese Office Action in Chinese Patent Application No. 210680068724.7, dated Oct. 28, 2019, 11 pages.

* cited by examiner

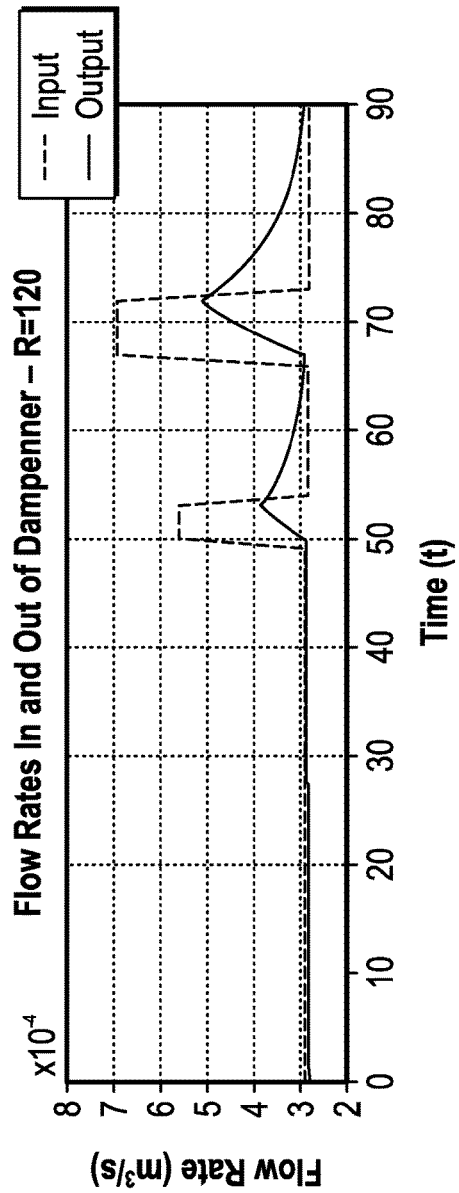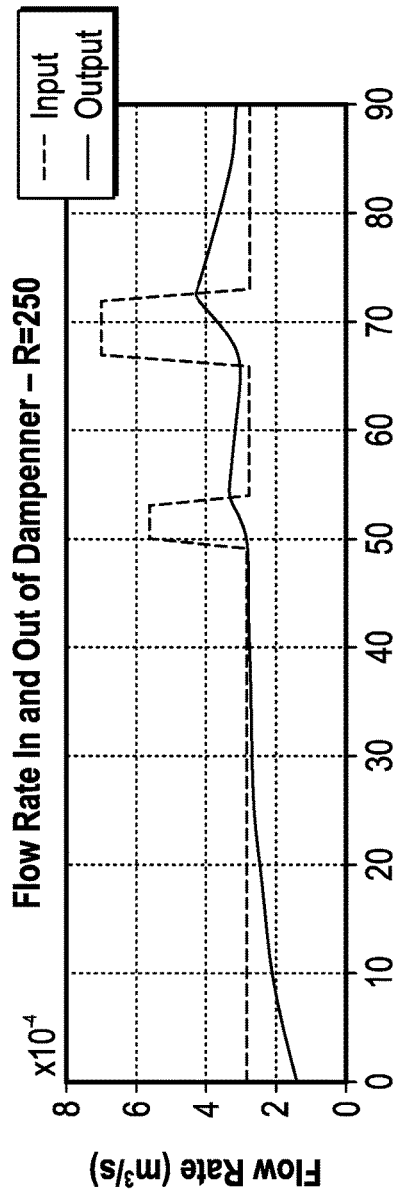
FIG. 3A
FIG. 3B

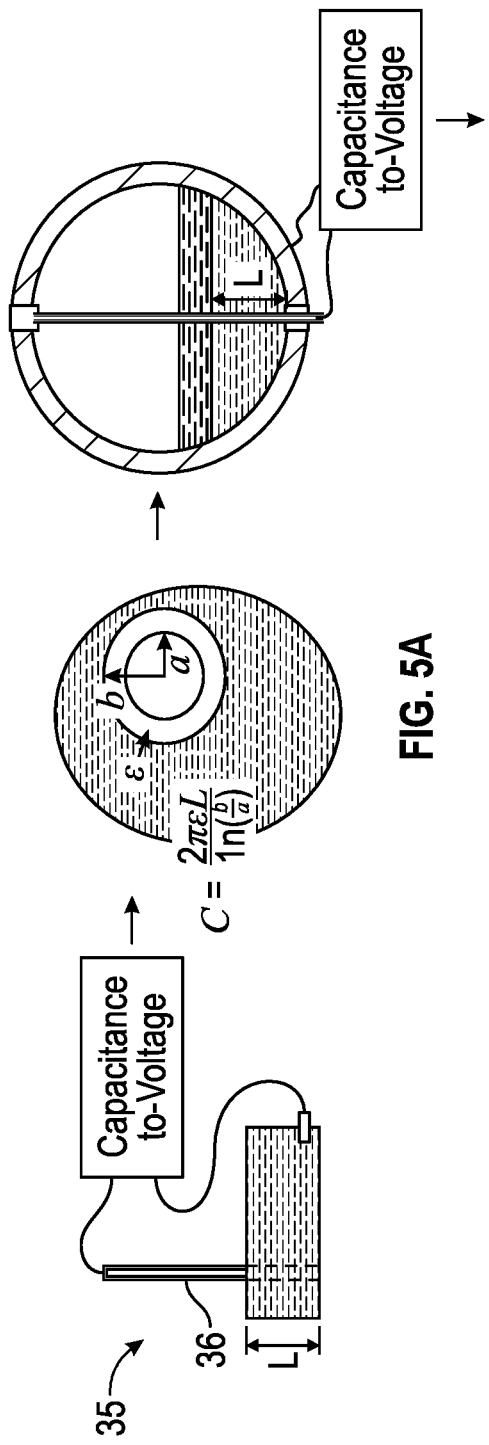
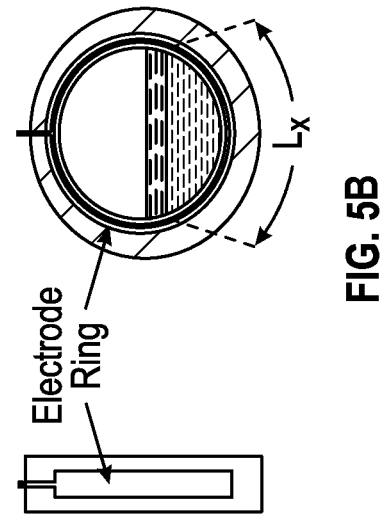
FIG. 5A
FIG. 5B

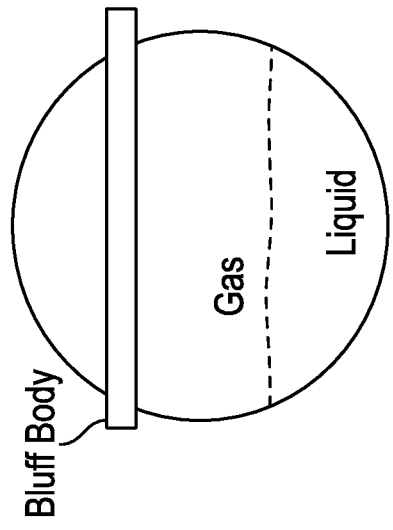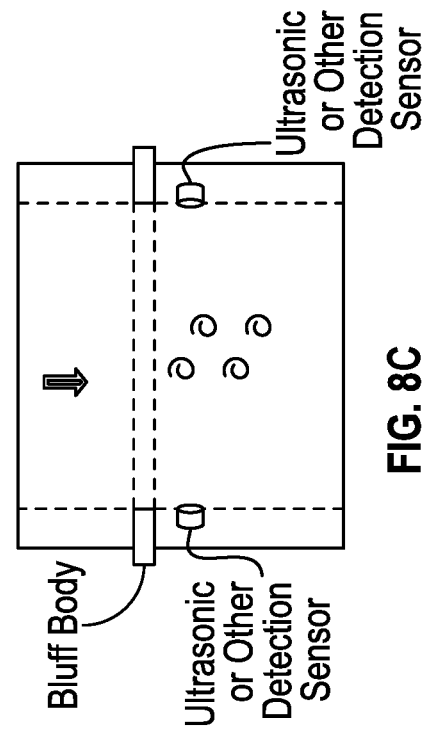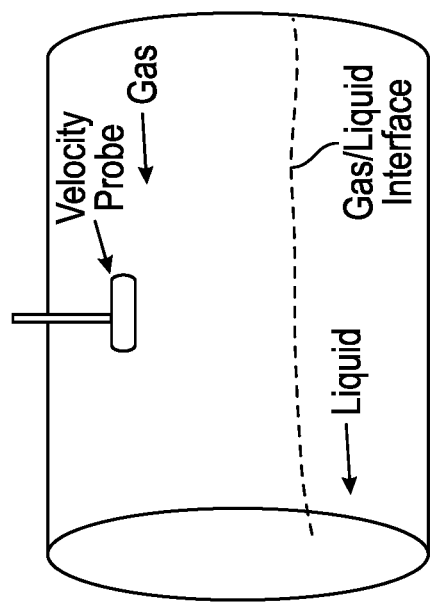
FIG. 8B
FIG. 8C
FIG. 8A

STRATIFIED FLOW MULTIPHASE FLOWMETER

CROSS-REFERENCE TO RELATED APPLICATIONS

Priority is claimed from GB Application No. 1520708.7 filed on Nov. 24, 2015 and incorporated herein by reference in its entirety.

BACKGROUND

Embodiments of the present disclosure relate to the field of measuring multiphase flow of fluids in a hydrocarbon-bearing reservoir, well or pipe. More particularly, embodiments of the present disclosure may provide an apparatus that measures multiphase flow of fluids in a surface production pipe connected to such hydrocarbon-bearing reservoirs. Further, the invention relates to a method of measuring multiphase flow of fluids produced by/from a hydrocarbon-bearing reservoir.

The measurement of flowrates of the multiphase flow of flow of oil, gas and water flowing through a hydrocarbon-bearing reservoir pipeline is an important consideration for production management of a well. Techniques for measuring such flowrates are generally well known and there are two types of well-known approaches to multiphase flow measurement.

One known technique is to measure the flow as a well-mixed mixture of different phases, (liquid and gas, predominantly) in which global parameters such as mixture density and velocity are measured to determine the flow rates. For the gas phase, which typically travels faster than the liquids, slip correlation is used to estimate its velocity. A typical example of this type is the commercial Vx flowmeter produced by Schlumberger, which combines nuclear based phase fraction measurements with Venturi-based differential pressure measurement to determine the flow rates of the multiphase fluid.

A second technique is to separate out the phases, according to their densities, so that separate velocity and holdup measurements can be applied to each of the individual phases. In such a technique, often via a swirl generator, the multiphase flow is separated into an annular flow with a gas core and a liquid annulus. Ultrasonic techniques may be used to measure the liquid fraction and velocity, and the flow rate of the liquid phase can be derived from these measurements. The liquid holdup and velocity measured by ultrasound can then be combined with the differential pressure measurement across a Venturi flowmeter to derive gas flow rate.

The swirl based flowmeter has several limitations, however, namely the separation of gas from liquid is affected by trapped microsized gas bubbles in the liquid layer that are difficult to remove, particularly when the liquid is viscous. Thus, the presence of micro gas bubbles makes ultrasound propagation through the liquid layer difficult, leading to erroneous liquid holdup and velocity measurements.

Moreover, based on the time-of-flight measurement principle, the accuracy of the ultrasonically measured holdup is limited by the unknown speed of sound in the liquid phase. Further, the operational range of the flowmeter is limited, with a typical turn-down ratio of around three (3). The lower end of the range is reached when the liquid flow rate drops to a level that no longer carries sufficient momentum to produce a swirl; the higher end is limited by the total pressure drop across the meter, which can be several times more than that produced by a Venturi when no swirl is used. This high pressure drop may be an issue for field where pressure may be used to control the flow of the mixture.

SUMMARY

Embodiments of the present disclosure are directed to providing a flowmeter in which an apparatus is configured to generate stratified flow of multiphase fluid and combine this with velocity and holdup measurement means which are applied to the separate phases of gas, oil and water. Moreover, ultrasonic based measurement techniques may be used to measure the liquid holdup, oil holdup, liquid flow rate and gas flow rate, and the use of an electrical capacitance based water holdup sensor, may allow for the flow rate of oil and that of water to be determined separately, providing a full oilfield three-phase flowmeter.

In embodiments of the present disclosure relate, an accumulator is provided that is integrated with the multiphase flow measurement system in order to provide the stratified flow. The conditioner is provided with an inflow orifice—which is sized and shaped in an appropriate manner to receive the inflow pipe from the gas and oil well system—and a container comprising an outflow orifice for passing the flow mixture through to a further vessel. In a preferred aspect, the lowest point of the inflow orifice is positioned at a low, or indeed the lowest, point on the sidewall of the accumulator, as this allows for gentle flow of the fluid from the pipe into the accumulator.

The outflow orifice may be provided either in the same sidewall of the accumulator, or more preferably in a different perhaps opposite sidewall of the accumulator. In some aspects, the height of the lowest portion of the outflow orifice is above the lowest point of the inflow orifice. In this manner, the multiphase fluid entering the accumulator will not immediately flow out of the accumulator into the outflow vessel, and will have enough time to settle and the different phases can appropriately separate out.

The container of the accumulator further preferably comprises a phase distributor at the interior side of the accumulator and by the inflow orifice. The phase distributor operates in such a manner that the flow entering from the inflow pipe will be appropriately directed such that the different phases can separate and the flow of liquid phases remains near the bottom of the accumulator, wherein the gas flow moves upward toward the higher portion of the accumulator. This also assists in the generation of stratified flow. Further present in the accumulator is a resistance device, wherein this resistance device is positioned next to the outflow orifice. By positioning the resistance device near the outflow orifice, the effects of slugging flow can be minimised as the accumulator will appropriately hold the incoming multiphase fluid and allow the gas and liquid phases to appropriately settle out.

The structure of the phase distributor is one in which a central pipe is provided that fluidly connects to the orifice through which the multiphase fluid passes. The pipe is provided with a series of side slots, at least one thereof. The side slots are positioned to encourage the liquid part of the multiphase fluid to pass through the sides and enter the lower portion of the accumulator. In order to direct the liquid flow away from the central pipe, a series of fins are provided wherein the fins generally reduce in size as the pressure of the fluid in the internal pipe drops. This reduction in fin size assists in distributing the fluid within the accumulator. The end of the pipe of the phase distributor is preferably blocked, as this ensures that the fluid does not immediately pass through the pipe and ends at the accumulator without being appropriately directed, this assists with the phase separation. One or more slots are provided in the upper side of the tube in order to allow the gas phase to appropriately separate out and enter the upper part of the accumulator. A preferred design for the upper slot is that of a T, wherein the side parts of the T-structure encourage the flow of gas to the outer and upper portions of the accumulator, thus improving the generation of stratified flow.

The exit flow resistance device at the outflow orifice of the accumulator assists in reducing the amount of immediate fluid flow out of the accumulator and into the measurement or outflow vessel. The resistance device preferably comprises a series of plate-like elements which are held parallel with each other. The gap between these plates can be adjusted so as to appropriately straighten the fluid flow leaving the accumulator, as well as slowing the flow down further to encourage and generate stratified separate phase flow. Preferably, the plates are oriented such that their plate-like elements extend along the normal to the outflow orifice.

In some embodiments of the present disclosure additional plates are provided, typically at 90° to the first plates of the resistive element. These additional plates not only assist in strengthening the resistive device, but also assist in both slowing down the fluid flow and leading to even straighter more stratified flow at the exit. Preferably, the angle between these two sets of plates is 90° plus or minus 5°.

A different resistive device can be provided by means of a rigid block through which a number of straight bores are provided. These straight bores assist in the fluid flow passing in a regular manner through the resistive device and to the exit orifice of the accumulator.

In order to assist the stratified flow, the volume of the container may be large in comparison with the inflow pipe entering the accumulator. Preferably, the cross-sectional area of the accumulator is at least twice the cross-sectional area of the inflow pipe, and preferably even greater in size. Further, the length of the accumulator may be at least twice the diameter of the inflow orifice—or at least the longer side thereof, should the inflow orifice not be circular. In this manner, in embodiments of the present disclosure, the accumulator is of large enough size, such that the flow into the accumulator will not completely fill the accumulator and will allow for the multiple phases to separate and stratified flow at the outflow orifice to be ensured.

In some embodiments of the present disclosure, a multiphase flow measurement system is provided which at the inflow portion includes the above described accumulator. In some embodiments of the present disclosure, at the outflow orifice of the accumulator, the outflow vessel is constituted by means of an inclined measurement vessel which extends outward from the outflow orifice and is directed generally away from the accumulator. The inclination of the measurement vessel is generally downward from the outflow orifice of the accumulator such that the second end of the measurement vessel, that being farthest removed from the accumulator, is lower than the lowest point of the outflow orifice of the accumulator. Providing the inclined measurement vessel ensures the continued stratified flow and further separation of the phases of the fluid flow exiting the accumulator.

In some embodiments of the present disclosure, it is preferred that the measurement vessel of the measurement system has, with reference to the ground/horizontal, an angle of inclination which lies between 0 and 75°. Preferably, this range is between 0 and 50°, or 0 and 30°, or more preferably in the range of 0 to 15°, or even 0 to 10° and even more preferably in the range of 0 to 5°.

In order to further promote and continue the stratified flow through the measurement vessel, the cross-sectional area of the measurement vessel may preferably be greater than the cross-sectional area of the inflow orifice and inflow pipe into the accumulator. However, in some aspects, the cross-sectional area of the measurement vessel may be the same as or not much smaller than the cross-sectional area of the inflow orifice and inflow pipe into the accumulator so as to provide for maintaining the stratified flow. Further, in some embodiments, the cross-sectional area of the measurement vessel is smaller than that of the accumulator, thus meaning that in such embodiments the cross-section of the measurement vessel lies between the sizes of the accumulator and the inflow pipe.

The length of the measurement vessel is helpful in maintaining and promoting the stratified flow, and this may be at least three times the diameter of the measurement vessel, or at least the longest side thereof should the measurement vessel not be circular. Further, in some embodiments, the maximum length of the measurement vessel is approximately up to 50 times the diameter or longest side of the measurement vessel. In some preferred embodiments, the maximum length of the measurement vessel is approximately up to 20 times the diameter or longest side of the measurement vessel. This proportion ensures that the fluid flow does not lead to significant slowdown or backup of the fluid into the accumulator.

In order to make measurements on the stratified multiphase fluid, a number of sensors can be positioned along the measurement vessel. In particular, because the system can generate a known stratified flow through the measurement vessel, in some embodiments of the present disclosure, it is preferable to position the sensors at a region of the measurement vessel which will provide the most stable and beneficial flow for making accurate measurement. In embodiments of the present disclosure the size of the accumulator, the angle of the measurement vessel, as well as the selection and arrangement of measurement sensors can be adjusted to suit different applications, such that the system can cope with different flow rates at the inlet and fluid properties of multiphase fluid flow. By adjusting these properties of the flowmeter, the stratified flow at a particular point of the measurement vessel can be ensured such that the positioning of the sensors in and around this point will lead to accurate/repeatable measurement.

In embodiments of the present disclosure, the sensors for making measurements on the flow through the measurement vessel may be positioned either inside or outside of the measurement vessel. Preferred designs include incorporating the sensors on the outside of the measurement vessel and affixing these to the measurement vessel in a moveable manner. By proceeding in this way it is possible to allow for movement of the sensors in an easy manner should the nature of the fluid flow change and the location of the stable stratified flow also change in the system.

Within the sensor system, a number of different sensors can be provided. For example, ultrasonic gas flow velocity sensors may be provided, wherein these are preferably in the upper part of the measurement vessel where it is expected that gas flow within the stratified flow will be prevalent. Likewise, ultrasonic liquid fraction and velocity sensors can be provided in the lower portion of the measurement vessel where it is expected that liquid fluid flow will predominate. Additional sensors such as temperature sensors and pressure sensors may also be provided in order to allow for appropriate fluid and liquid flow measurements to be made.

In operation, it is possible that water is a part of the multiphase fluid entering the measurement system. Typically, water is the densest phase of the multiphase fluid and as such it forms the lowest layer in a stratified multiphase flow. In order to determine the volume or height of the water, a water level sensor can be provided. In embodiments of the present disclosure, this water sensor comprises a capacitance measurement sensor, which has a dipstick or dip ring configuration and an insulated conductor. A capacitance is measured between the water flowing through the measurement vessel and the insulated conductor, such that the height of the water can be determined. The possibility of positioning this in a known region of stratified fluid flow is particularly advantageous, in accordance with embodiments of the present disclosure, as previous attempts to measure the height or volume of water in such wells has proven difficult with regard to the mix between the water and hydrocarbon fluids and liquids.

In order to avoid backflow of fluid, particularly liquid, from the end of the measurement vessel disturbing the stratified fluid flow, in some embodiments of the present disclosure, a second downstream accumulator can be provided.

Providing this accumulator at the lower or distal end of the measurement vessel allows for the fluid exiting the measurement vessel to appropriately collect and pass out through an orifice at the downstream end of the downstream accumulator back, into the normal pipework of the external fluid handling system. By providing the lower portion of the downstream accumulator at a lower point than the exit of the measurement vessel, a further volume of accumulated fluid can be obtained which will then avoid backflow of the liquid into the measurement vessel. This is further enhanced by ensuring that the outflow orifice from the downstream accumulator into the outflow pipe is positioned approximately at the bottom of the sidewall of the downstream accumulator, thus meaning that the liquid can readily flow out of the outflow pipe.

In order to further encourage stratified flow in the measurement vessel, a further flow straightener may be positioned at the outflow of the measurement vessel and in particular within the downstream accumulator volume. The downstream flow straightener can have the same configuration as the upstream flow straightener as disclosed above, and will further ensure that stratified flow exists within the measurement vessel.

As described above, embodiments of the present disclosure provide a mechanism by which a measurement system can be included in a normal piping network, wherein the inline inclusion of the measurement system and its design provides that stratified flow is generated in a measurement vessel; allowing for measurement of multiphase fluid flow. The combination of the upstream and downstream accumulators ensures that the inflow of multiphase fluid can appropriately gather and separate such that the gas and liquid flowing through the measurement vessel is separate and stratified.

It is noted that the system can be provided with standard components, such as standard pipework and gaskets for connecting and forming each of the two accumulators and the inclined measurement vessel, wherein these can readily be bolted into a section of pipework. To this end, in embodiments of the present disclosure, the system may be added into an existing pipework network at a desired location, and the inclination and volume of the accumulator appropriately determined to ensure that within the measurement vessel stratified flow is achieved.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

FIGS. 3A and 3B illustrate an input and output flow rate of the slug catcher with pulsating input flow (slugging) for two $R_o$ values, 120 (FIG. 3A) and 250 (FIG. 3B); assuming L=0.3 m, D=0.17 m and h2(0)=0.035 m (i.e. some liquid in the pipe at t=0) with input flow initially at 150 BPD, pulsing to 300 BPD during 50-53 seconds, and again to 450 BPD between 67 and 72 s, from a flowmeter system in accordance with some embodiments of the present disclosure.

FIG. 5A illustrates a capacitance water level sensor with an insulated conductor (dipstick/dip-ring) as first electrode and FIG. 5B illustrates a capacitance water level sensor with water as second electrode to convert water immersed section length of first electrode into a capacitance value for use in a flowmeter in accordance with some embodiments of the present disclosure.

in FIG. 7A, using an electromagnetic based WLR measuring probe as an invasive sensor in a liquid mixing zone in a downstream flow conditioner, where a distance y2 is designed to produce sufficient mixing between oil and water; and in FIG. 7B, creating a liquid-rich flow in a vertical section next to a downstream flow conditioner, which serves as a gas/liquid separator, and use a water content or WLR senor, e.g. an inductance or microwave based one, to determine the WLR on this vertical section;

each of which may be used in a flowmeter in accordance with some embodiments of the present disclosure.

FIGS. 8A, 8B, and 8C illustrate alternative methods of gas velocity measurement, including:

in FIG. 8A, use of one or more local velocity probes, such as a turbine flowmeter (e.g. mini-spinner), a V-cone flowmeter, a Pitot tube, a hot wire anemometer, or hot body heat transfer probe, etc.; and in FIGS. 8B and 8C, use of a vortex shedding based flow velocity measurement system with ultrasonic, thermal or pressure based vortex detection sensor;

each of which may be used in a flowmeter in accordance with some embodiments of the present disclosure.

Figure 9:
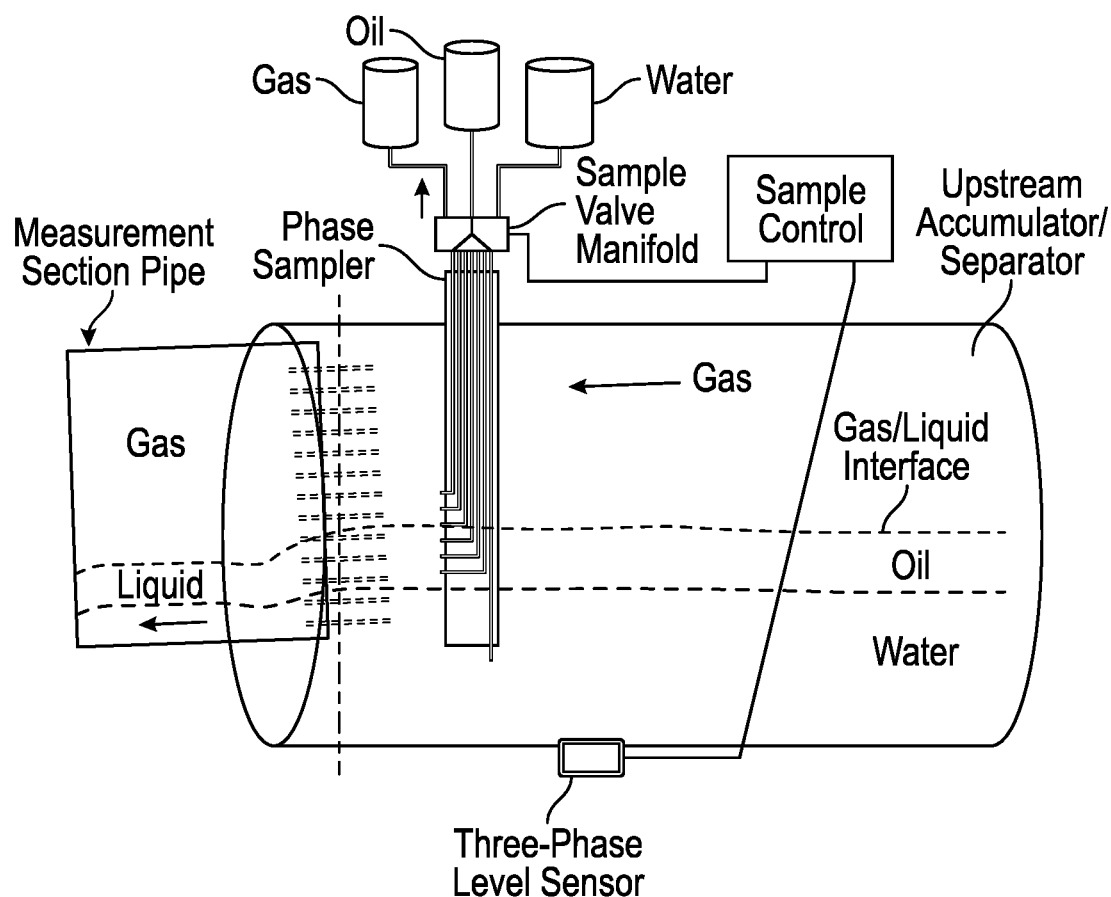

FIG. 9 illustrates methods for obtaining samples of gas, oil and water phases by combining a three-phase interface level measurement system with a multi-entry sampler device with selective control of sampling locations on the vertical axis and connecting the correct sampling tube to relevant sample bottle, in accordance with some embodiments of the present disclosure.

Figure 10A:
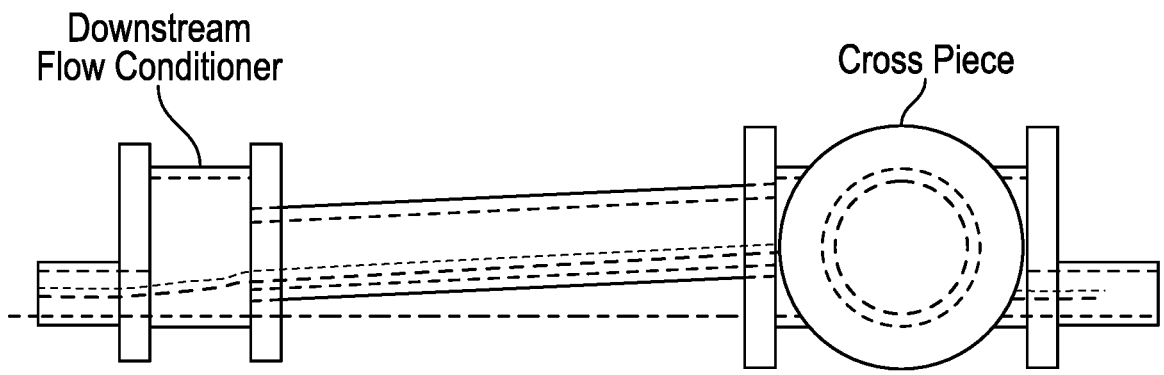
Figure 10B:
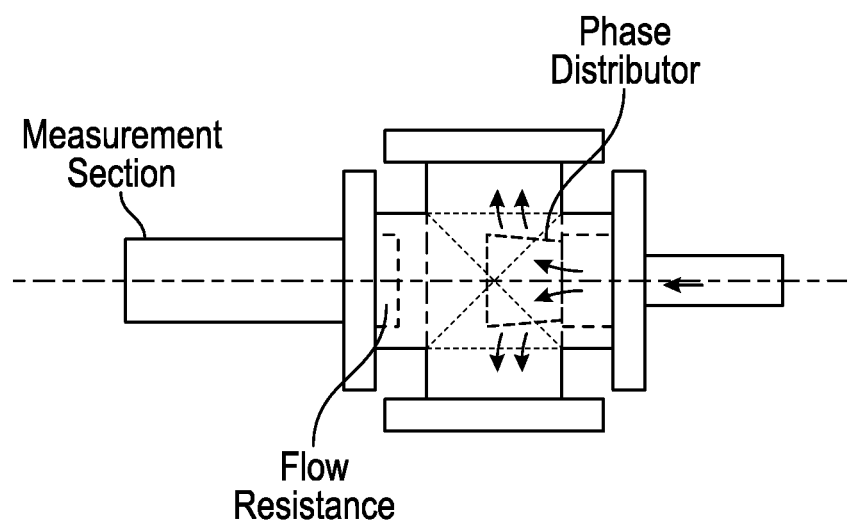

FIGS. 10A and 10B illustrate respective side and top views of a design of flow conditioner/accumulator/separator based on a cross pipe piece, in accordance with some embodiments of the present disclosure.

Figure 11:
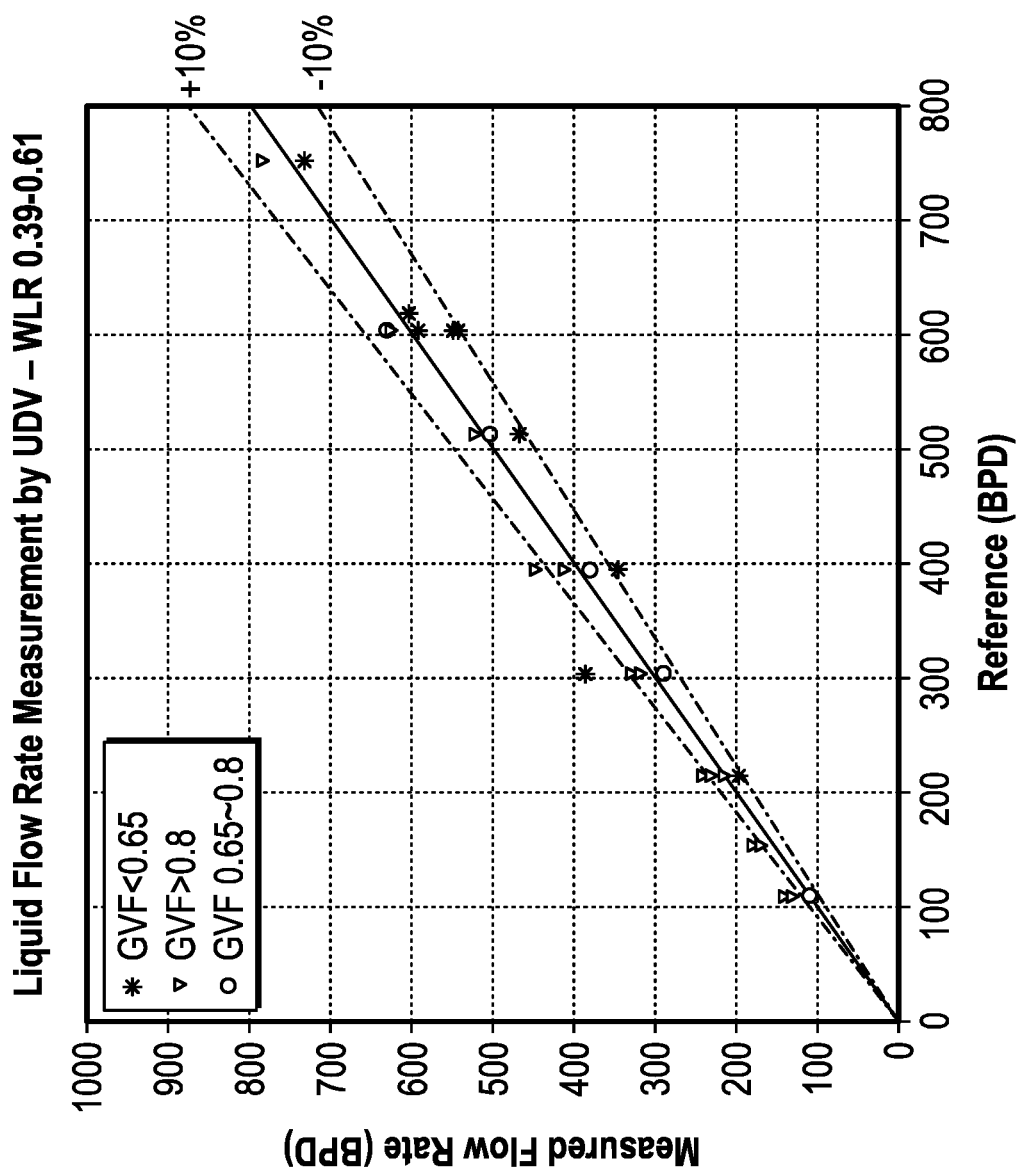

FIG. 11 illustrates calibration of liquid flow rate measurements on a three-phase flow loop—measured liquid flow rate versus flow loop reference for WLR range of 0.39-0.61 and GVF range of 0.47 to 0.95; data acquired with a single clamp-on ultrasonic Doppler probe mounted on the underside of the pipe and driven by a commercial range-gated ultrasonic Doppler velocity profiling instrument, for a flowmeter in accordance with embodiments of the present disclosure.

Figures 12A, 12B:
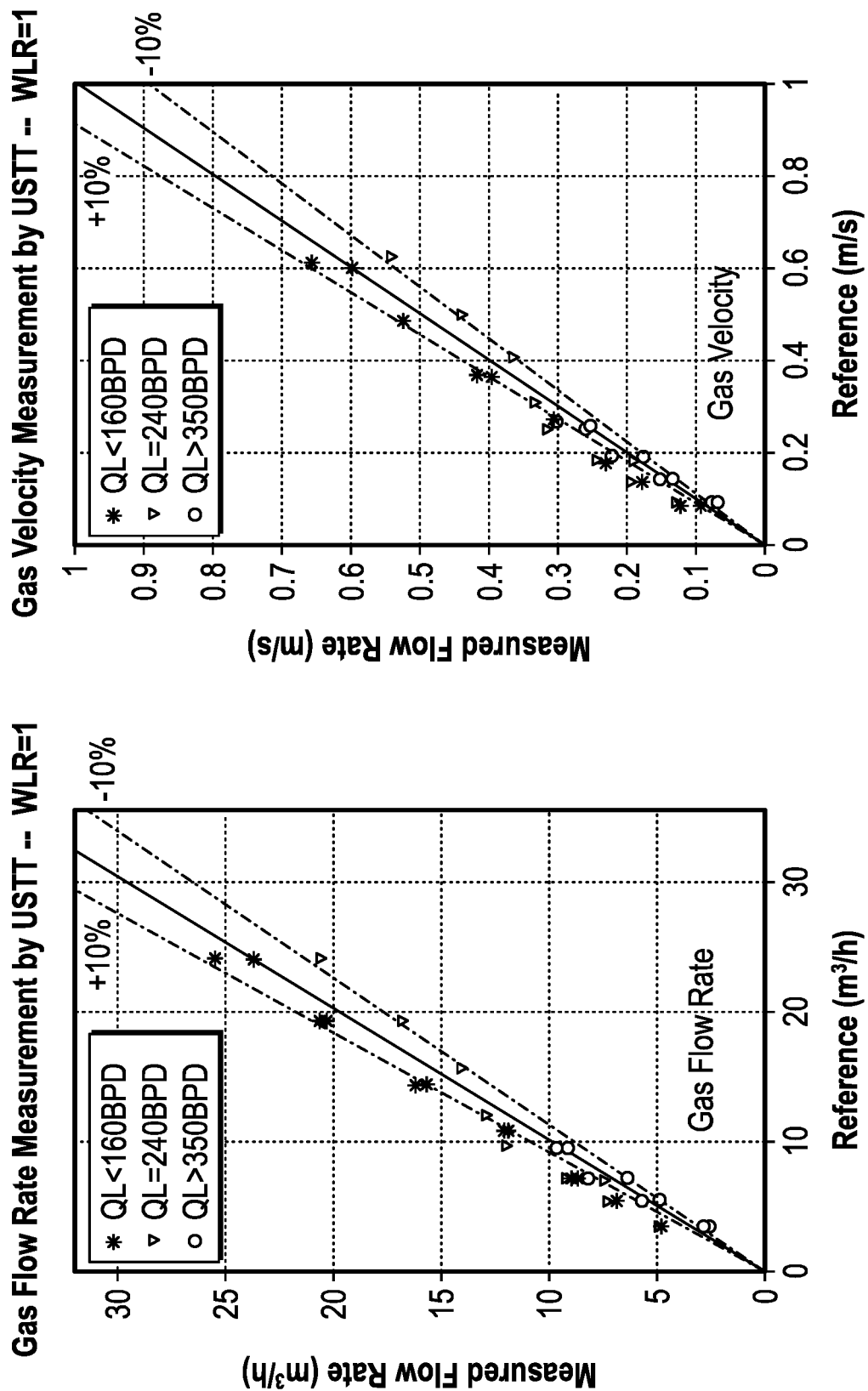

FIGS. 12A and 12B illustrate calibration of gas flow rate (FIG. 12A) and gas velocity (FIG. 12B) measurement on a three-phase flow loop for WLR value of 1 and GVF range of 0.54 to 0.97; data acquired with a commercial ultrasonic transit time gas flowmeter and with pulse transmission along a path of 45° (with respect to axial) across the pipe (120 mm ID) at 20 mm above the pipe center (velocity reference derived from reference gas flow rate and a measured gas across sectional area by the clamp-on ultrasonic Doppler method), for a flowmeter in accordance with embodiments of the present disclosure.

Figure 13B:
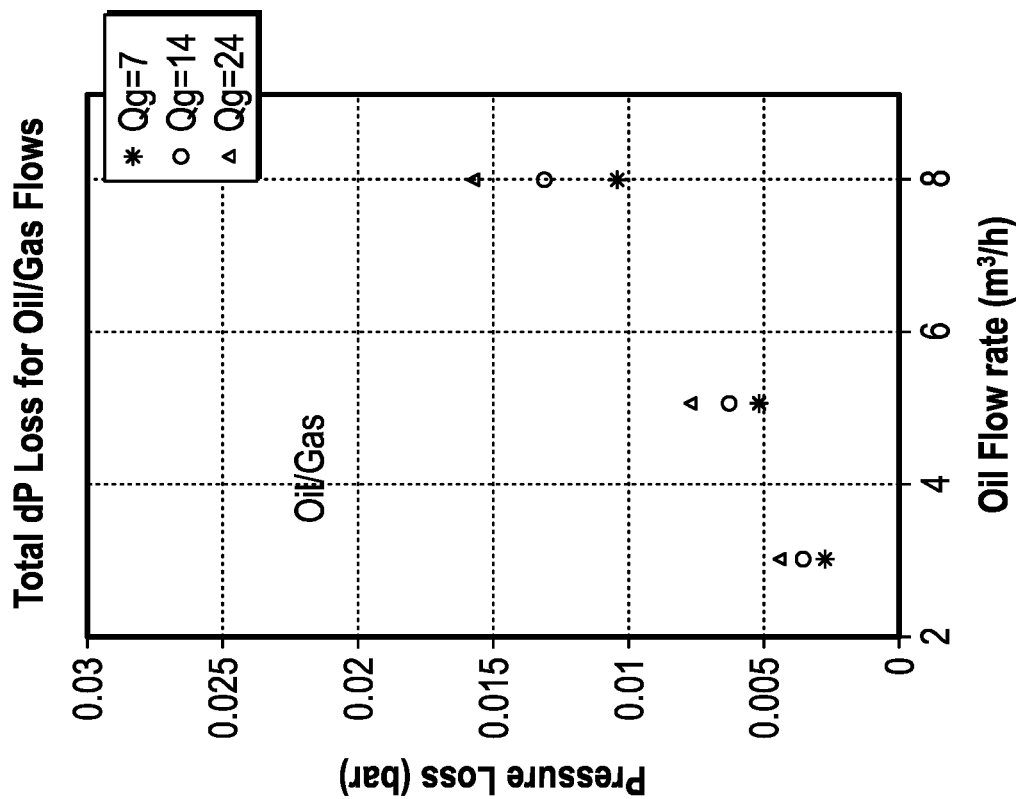
Figure 13A:
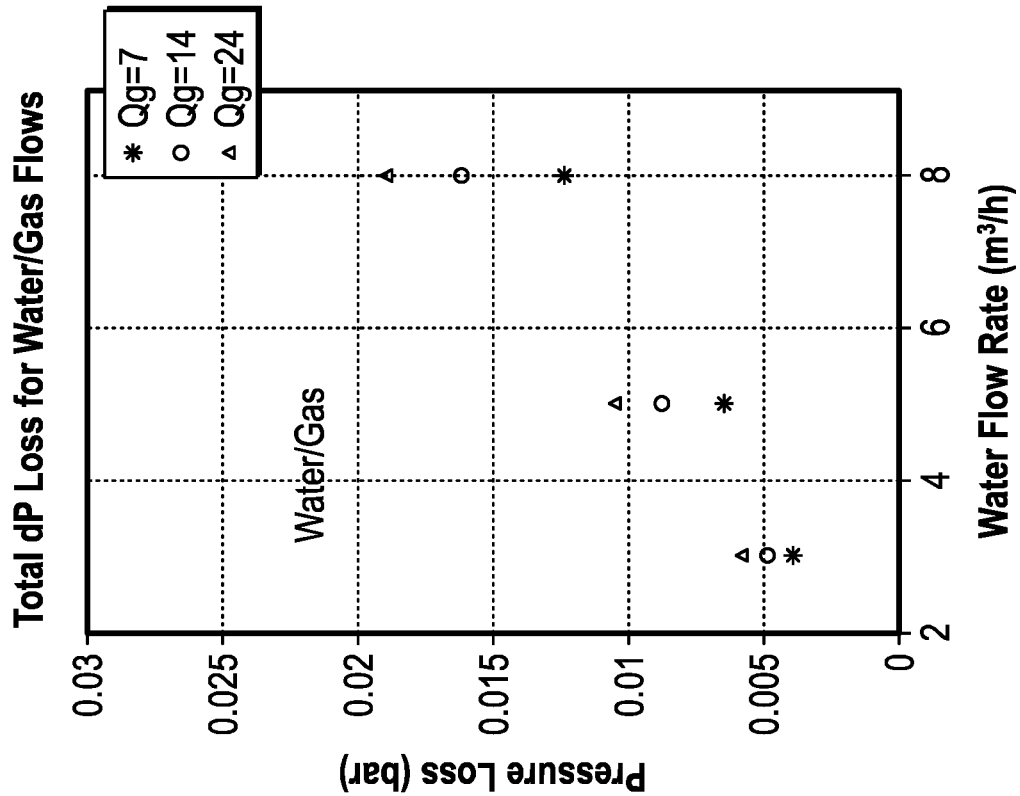

FIGS. 13A and 13B illustrate pressure loss across a flowmeter, in accordance with embodiments of the present disclosure, for gas/water (FIG. 13A) and gas/oil (FIG. 13B) flows, measured on a flow loop (1.4 bar absolute pressure).

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Embodiments of the present disclosure may include two important features: the first is a compact fluid handling and conditioning system that generates a stratified flow in a metering pipe section and the second combine this stratification system with various appropriate measurement means that measure the velocity and holdup of individual phases, gas, liquid, oil and water, which are separated by the said stratification system. Further combination of the measurements produces the required outputs of a gas/oil/water multiphase flowmeter. Examples of the measurement means, for gas velocity, include various ultrasonic transit-time gas velocity meters, thermal probe based on heat transfer measurement, mini-spinner turbine velocity sensor, Pitot tube, and Vortex shedding measurement systems, for liquid, water and oil velocities, these include systems based on ultrasonic Doppler and transit time (including cross-correlation) measurement techniques, for liquid and water holdups, ultrasonic sensors, differential pressure and electromagnetic based sensors, such as microwave, electrical impedance/capacitance and eddy current effect based inductive sensors.

In embodiments of the present disclosure, appropriate conditioning of the flow can convert a slug flow into a stratified flow, thus extending the stratified flow regime over the entire range of the flow rates encountered by the flowmeter.

Figure 1:
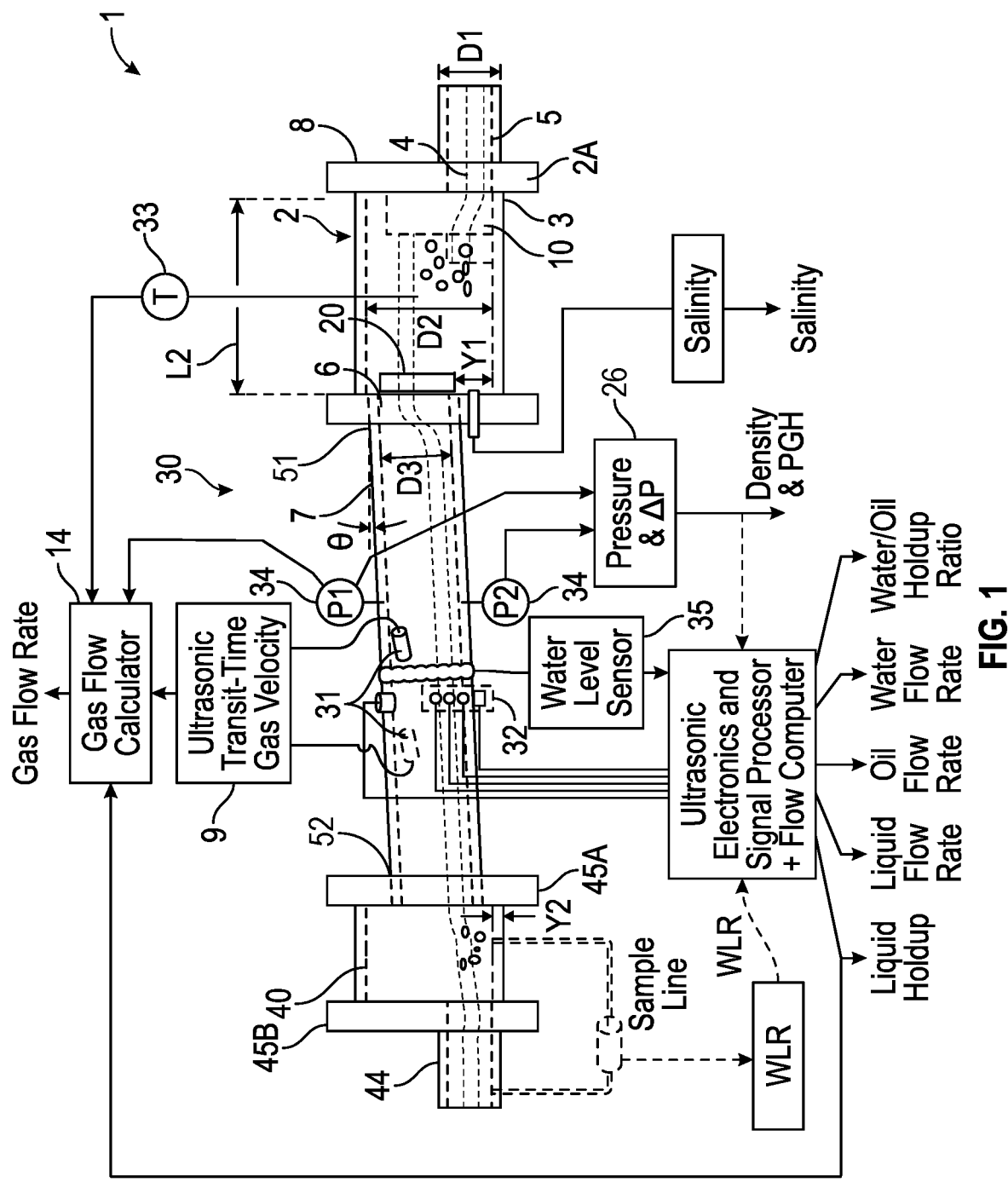
FIG. 1 illustrates a stratified flow generator and ultrasonic based gas and liquid flow measurement sensor systems, capacitance based water holdup sensors, with additional P, T, ΔP, ultrasonic through-gas, salinity measurements and on-line liquid sampling, in accordance with some embodiments of the present disclosure.

FIG. 1 shows a schematic of a multiphase flow measurement system 1, in accordance with some embodiments of the present disclosure. In FIG. 1, the flow system 1 comprises an upstream flow conditioner, primarily in the form of a conditioning accumulator 2, followed by a downwardly inclined measurement vessel 30, shown as a pipe section, in which a primarily stratified gas/oil/water flow is generated, and followed by a downstream flow accumulator 40 comprising two flange plates 45A and 45B. The fluid entry and exit locations, to and from the two accumulators, are important design features of this embodiment.

As shown by FIGS. 2A to 2E, the upstream conditioning accumulator 2 may be implemented by using a sufficiently large volume, for instance, a section of pipe with a diameter, d2 that is significantly greater than a diameter d1 of the inflow pipe 5, and a length L2 that is also greater than d1. In some aspects, L2 ranges from 0.1 meters to 1 meter. In some embodiments of the present disclosure, this accumulation volume may comprise a section of pipe, a T-junction pipe piece or a cross-junction piece, which are readily available commercially in the range of 4-inch to 12-inch nominal diameter.

Figure 2B:
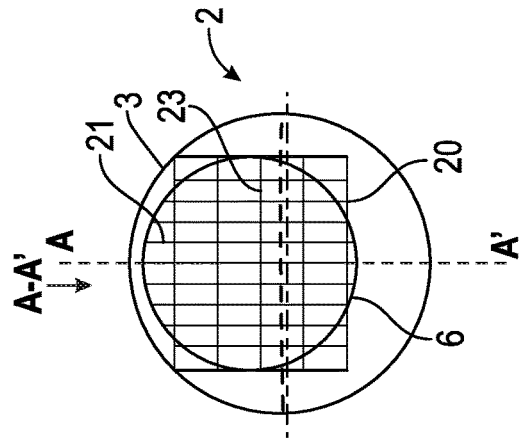
FIG. 2B is a side cross-sectional view of an upstream flow accumulator/slug-catcher taken along line A-A' of FIG. 2A.
Figure 2A:
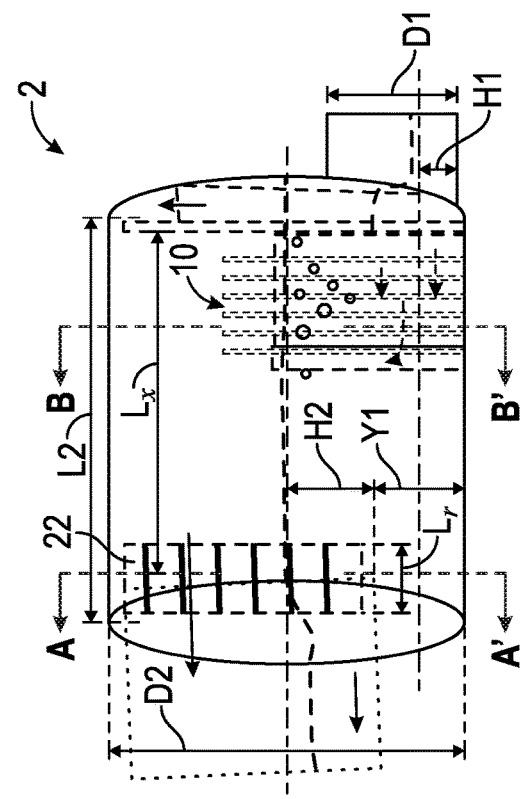
FIG. 2A illustrates an upstream flow accumulator/slug-catcher with optional flow direction-diverter/phase-distributor and exit flow resistance device as well as exit interface to the downwardly inclined pipe, in accordance with some embodiments of the present disclosure.
Figure 2E:
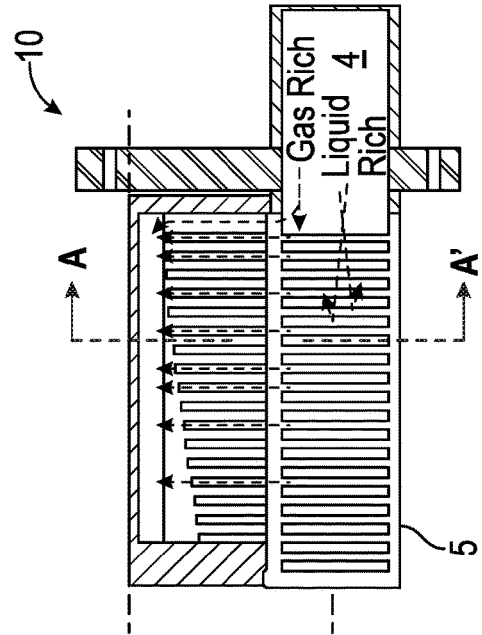
FIGS. 2D and 2E are cross-sectional views of a flow straightener taken along lines A-A' and B-B', respectively of FIG. 2C.
Figure 2D:
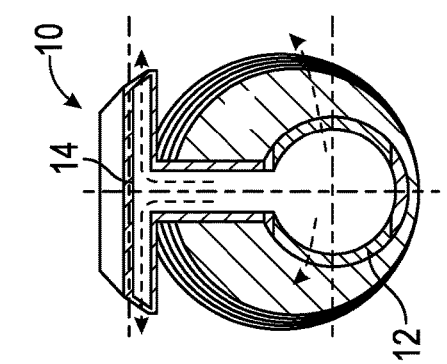
Figure 2C:
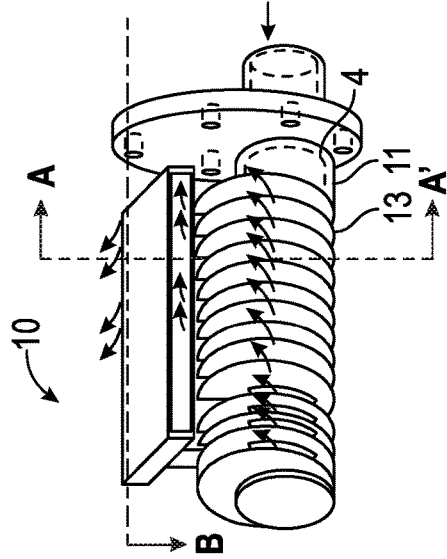
FIG. 2C illustrates a flow straightener for use with a downstream accumulator, in accordance with embodiments of the present disclosure.

Inside the volume, in some embodiments of the present disclosure, two internal components are used to improve the slug catching and phase separation performance of the upstream flow conditioner. The first of these is a phase distributor 10, as shown in FIG. 1, its function is to distribute the liquid and gas phases to where they should be in the volume of the accumulator 2, without causing excessive mixing between the phases during such a process. This is implemented typically by a design based on an appropriate pipe network and flow guiding plates 22 (FIG. 2A).

In this example, the design allows a major proportion of gas to be stripped and diverted to the upper part of the conditioning accumulator container 3 as the multiphase mixture first enters it, and slows down the liquid phase by distributing it more evenly to an appropriate part of the liquid zone in the volume, e.g. towards the side walls of the container 3, or to the two transversely oriented branches if a cross piece is used as the accumulator 2, allowing sufficient residence time for oil and water to separate.

The second internal component is an exit flow resistance device 20, whose function is to resist flow-out from the accumulator 2, such that a sudden increase in the inlet liquid flow rate due to slugging is converted to an increase in liquid level in the accumulator 2, and the flow out from the volume into the measuring vessel 30 is regulated to smooth out the flow rate impulses. This resistive device 20 can be implemented by a flow straightener 20 with straight holes or by an assembly of parallel plates, as shown in FIG. 2B. The resistance device 20 also serves as a flow straightener, such that the required development length before the sensors in the measuring vessel 30 can be reduced significantly.

The following model shows that such an accumulator 2, in accordance with some embodiments of the present disclosure, will smooth out the liquid flow slugging considerably, convert slugging into liquid level fluctuations in the accumulator 2 and therefore act as a liquid slug catcher.

In embodiments of the present disclosure, assuming that:
1) the output flow rate depends on the liquid level above the lower of the outflow orifice 6, $h_2$, and the exit flow resistance $R_x$, and
2) The liquid level is close to the centre of the accumulator 2 and the length of the level, $L_x$, after the hydraulic jump, does not change much during a moderate slugging process, therefore the cross sectional area of the liquid/gas interface at $h_2$ is nearly a constant, i.e.

$$A(y) = L_x \cdot D \tag{1}$$

Then from these assumptions $$q_o = \frac{\rho \cdot g \cdot h_2}{R_x} = h_2 / R_o \tag{2}$$

where $\rho$ is the density of the liquid, g the gravitational acceleration and $$R_o = R_x / (\rho \cdot g) \tag{3}$$

From conservation of mass, the incremental liquid volume in the accumulator 2 is the difference between the input and output liquid flow:

$$A \cdot dh_2 = \left(q_i(t) - \frac{h_2}{R_o}\right) \cdot dt \quad (4)$$

i.e.

$$A \cdot \frac{dh_2}{dt} + \frac{h_2}{R_o} = q_i(t) \quad (5)$$

Assuming the input flow rate is a pulsating function, for instance $$q_i(t) = \begin{cases} 2 \cdot Q(m^3/s) & 50 \text{ s} < t < 53 \text{ s} \\ 3 \cdot Q(m^3/s) & 67 \text{ s} < t < 72 \text{ s} \\ Q(m^3/s) & \text{elsewhere} \end{cases} \quad (6)$$

where: Q is the steady state input flow rate before any pulsation.

An example of $q_i(t)$ function with $Q=0.28 \cdot 10^{-3}$ m$^3$/s is shown by the dashed trace in FIGS. 3A and 3B.

Solving equation (5) for the above example input function yields:

$$q_o(t) = k \cdot (1 - e^{-t/T} - 2 \cdot e^{-(t-50)/T} + 2 \cdot e^{-(t-53)/T} - 3 \cdot e^{-(t-67)/T} + 3 \cdot e^{-(t-72)/T}) + h_2(0) \cdot e^{-T/t}/R_o \quad (7)$$

where:

$$T = A \cdot R_o \quad (8)$$

is the time constant of this first order dynamic system, $h_2(0)$ is the liquid level at t=0.

The effect of the accumulator 2 depends on the time constant T, which, given the accumulator 2 size, A, is a function of the resistance element $R_o$. Assuming that $L_x = 0.3$ m, D=0.17 m and $h_2(0) = 0.035$ m, and two cases of $R_o = 120$ (FIG. 3A) and $R_o = 250$ (FIG. 3B) (with unit defined by Eq. (3)), then the output flow rate can be calculated by using equation (7). The results are plotted in solid trace in FIGS. 3A and 3B.

FIGS. 3A and 3B show that the input liquid flow rate pulses due to slugging have been smoothed by the low-pass filtering effect of the accumulator 2. In FIGS. 3A and 3B, the significant effect of the resistive element $R_o$ can be observed. Without the added resistive device 20 in the accumulator 2, the value of $R_o$ will depend on viscous and turbulent losses of the flow in the accumulator 2; adding the resistive device 20 will provide an extra degree of control to the slug filtering effect.

As a result of gravity, inclination will change the cross-sectional holdup of different phases. For instance, in an oil/water stratified flow, the water layer at the lower part of the pipe, due to gravity, travels faster than oil; for the same flow rate, the faster moving layer should have a smaller cross-section and the slow layer a thicker cross-section. For oilfield flowmetering, the flow rate of oil is more interesting than that of water. In an inclined pipe, the amplified thickness of the slower flowing oil layer helps to reduce its holdup measurement uncertainty, which is a beneficial effect of a flowmeter in accordance with embodiments of the present disclosure.

The accumulator 2 described in this disclosure facilitates the downward inclination of the measurement vessel or pipe section 30 by lifting upward the interface location of this section to the accumulator 2, to an appropriate offset height of y1 above the bottom line of the inflow pipe 5, and by keeping the other end of the measuring vessel pipe section 30 at a much smaller offset height, y2, above bottom line of the outflow pipe 44. The deviation angle, δ, is determined by y1-y2 and the length of the measurement vessel or pipe section 30. Typically, the value of the downward inclination angle δ is set to within a range between 0 to 75 degrees; more preferably, it is set in a range between 0 to 5 degrees. The two end plates or sidewalls 8 of the accumulator at each end of the container 3, facilitate the connections between the accumulator 2 and the inflow pipe 5 and measurement vessel 30, with the flow entry at around the bottom part of the accumulator 2, and fluid exit at a height elevated by y1.

Because the exit level of the fluid of the upstream accumulator 2 is raised by the upward offset of the measurement vessel or pipe section 30, the liquid level, in the accumulator 2, is increased from that in the inflow pipe 5, h1, to h2 (see FIG. 2A). In embodiments of the present disclosure, the slugging liquid inflow is thus converted into a liquid level fluctuation at the overflow exit of the accumulator 2.

In general, to cope with inflow slugging, devices for increasing fluid exit resistance and for flow phase-distribution/direction-diversion are preferably installed inside the upstream accumulator 2. As shown in FIG. 2B, the exit resistive device 20 may consist of a number of flat preferably thin plates 21, mounted in parallel to each other in a stack, with an appropriate gap between the horizontally or vertically laminated plates for the fluid to flow through; the dimensions of each plate 21 (such as $L_r$ in FIG. 2A), the gap size between plates 21 and the total number of plates 21 in the stack can be designed according to the required smoothing/filtering effect to the slugging flow. Appropriate dimensions and the cross-sectional shape of flow direction diversion device or phase distributor 10 can be chosen to provide effective sideway distribution/diversion of the inflow, in order to reduce the vertical/horizontal mixing between different fluid phases during slugging.

In some embodiments of the present disclosure, the diameter of the measurement vessel or pipe section 30, d3, is greater than that of the inflow pipe 5, d1, and smaller than that of the accumulator 2, d2. An example would be d1=3-inch, d2=8-inch and d3=4~5-inch. In some embodiments of the present disclosure, the length of the measurement section 30 is may be between 5 to 20 times of d3.

In some embodiments of the present disclosure, a downstream accumulator 40, normally smaller in size than the upstream accumulator 2, may be used to condition the exit flow from the measurement vessel or pipe section 30, so that no fluids travels backwards into the measuring section 30 due to the choking effect of the smaller sized outflow pipe 44 downstream of the meter. This ensures the liquid level inside the metering section 30 does not change significantly at different axial locations along the same pipe or vessel section. Preferably, the downstream accumulator/conditioner 40 sets appropriate vertical offsets (via y2 shown in FIG. 1) to the metering vessel 30 at its inlet and the outflow pipe 44 interface at its exit, such that the gas/liquid interface level near the downstream end of the metering section 30 is higher than the top of the exit pipe. This minimizes back flow into the metering section 30.

In embodiments of the present disclosure, the measurement systems installed on the measurement pipe section may comprise:
  1. An ultrasonic gas flow velocity measurement unit or sensors 31 mounted around or above the central height of the measurement vessel 30, preferably on the upper half of the vessel 30 to avoid the influence of the liquid phase;

2. An ultrasonic liquid fraction and velocity measurement unit or sensors 32 mounted around the measurement vessel 30 circumference, mostly around and below the central height of the vessel 30;
3. A water level sensor 35 based on capacitance principle;
4. At least one, preferably two pressure sensors 34 measuring the gas pressure and a signal processing unit 26 deriving a differential pressure between the top side and bottom side of the pipe,
5. At least one temperature sensor 33, measuring the fluid temperature either on the measurement vessel section 30 or on one of the accumulators 2, 40.

In some embodiments of the present disclosure, the gas flow velocity may be measured, preferably by ultrasonic transit time based velocity sensors 31 on the upper half of the measurement vessel 30. In summary, the transit time method involves sending an ultrasonic pulse from a first transducer, receiving it at a second transducer at a location downstream of the transmitter and measuring the first ultrasound transit time, t1, in the direction of the flow; then reversing the transmitter/receiver pair and obtaining a second transit time of the ultrasonic pulse, t2, in the direction against the flow. This allows the determination of the gas flow velocity:

$$V_g = \left(\frac{1}{t1} - \frac{1}{t2}\right) \cdot \frac{L}{2 \cdot \cos\beta} \tag{9}$$

and also the speed of sound in gas:

$$c_g = \left(\frac{1}{t1} + \frac{1}{t2}\right) \cdot \frac{L}{2} \tag{10}$$

where: L is the distance between the transmitter and receiver, $\beta$ the angle between the pipe axis and the ultrasonic beam path (see FIGS. 4A to 4C). The ultrasonic transducers can be insertion types that directly in contact with gas, or clamp-on types that are mounted outside the measurement vessel 30.

The instantaneous liquid fraction signal from the range-gated ultrasonic Doppler system 32 mounted around the circumference of the measurement vessel 30 is used to provide the instantaneous cross-sectional area of the gas flow, using known methods. This area is then combined with the measured gas velocity, a measured gas pressure as well as a measured gas temperature to perform the gas flow rate calculation at 14 according to:

$$Q_g = (A_p - A_{liq}) \cdot \frac{P_s \cdot T_g}{P_g \cdot T_s} \cdot V_g \tag{11}$$

where: $A_{liq}$ is the cross-sectional area of the liquid phase measured by the range-gated ultrasonic Doppler sensors, $A_p$ the pipe cross-section, $V_g$ the velocity of the gas phase, $T_s$ and $P_s$ the temperature and pressure at standard conditions, e.g. 293K and 1 bar, and $T_g$ and $P_g$ those at the line condition.

The range-gated ultrasonic Doppler system with an array of sensors 32, preferably clamp-on types, also provides velocity profiles along multiple paths over the cross-section of the liquid phase. This is shown schematically in FIGS. 4A to 4C.

If the oil and water separates into stratified layers, then the gas/liquid and the oil/water interface levels may be determined by the ultrasonic Doppler scan system, by an ultrasonic impedance scanning system and/or the like. A more reliable and preferred method of measuring the water layer thickness is based on electrical capacitance principle. A number of examples of this are shown in FIG. 5A, where an insulated conductor 36 is immersed in water. This conductor 36 forms the first electrode of a capacitor, while the conductive water forms the second electrode, which is separated from the first conductor 36 by the known insulation layer of the first conductor 36. Electrical connection between water and a capacitance measuring circuit can be made through the metal vessel that carries the water flow, or through a specially made contact pipe that inserts into the pipe from the bottom side. The first conductor 36 can take various forms. Two examples are shown in FIGS. 5A and 5B. The first example in FIG. 5A is a simple insulated wire of cylindrical cross section, which can be installed along the vertical diameter of the vessel bore. The measured capacitance is simply proportional to the water level L:

$$C = \frac{2\pi\varepsilon}{\ln\left(\frac{b}{a}\right)} L \tag{12}$$

where: a is the radius of the conductor, b-a the thickness of insulation and E the permittivity of the insulation. The second example in FIG. 5B is an insulated ring electrode, which can be made full bore size of the pipe, and thus is no intrusive. Provided that the width of the electrode in the axial direction is much greater that the insulation thickness, the capacitance is given by:

$$C = \frac{w\varepsilon}{\delta} L_x \tag{13}$$

where: w is the electrode width in axial (flow) direction $\delta$ the thickness of insulation, $\varepsilon$ the permittivity of the insulation and $L_x$ the wet perimeter of the water cross-section. The level of water can be derived given the cross-sectional shape of the pipe.

With the identified gas/liquid and oil/water interfaces, the Doppler velocity points falling upon the cross-sections of the oil and water layers can be integrated appropriately to derive the flow rate of oil and that of water.

If the oil and water forms a mixture or emulsion, then several methods can be used to determine the water-in-liquid ratio (WLR). This can be done through an electrical impedance sensor immersed in the liquid phase of the upstream accumulator 2, through the acoustic impedance of the liquid measured by an in-wall leaky wave mode, or through a liquid sampling and measurement device. With the WLR obtained, the Doppler velocity profiles over the entire liquid cross-section are integrated to derive the flow rate of the liquid phase, $Q_{liq}$. The oil flow rate is determined by:

$$Q_{oil} = (1-\text{WLR}) \cdot Q_{liq} \tag{14}$$

and water flow rate by:

$$Q_{water} = (\text{WLR}) \cdot Q_{liq}. \tag{15}$$

Figure 6:
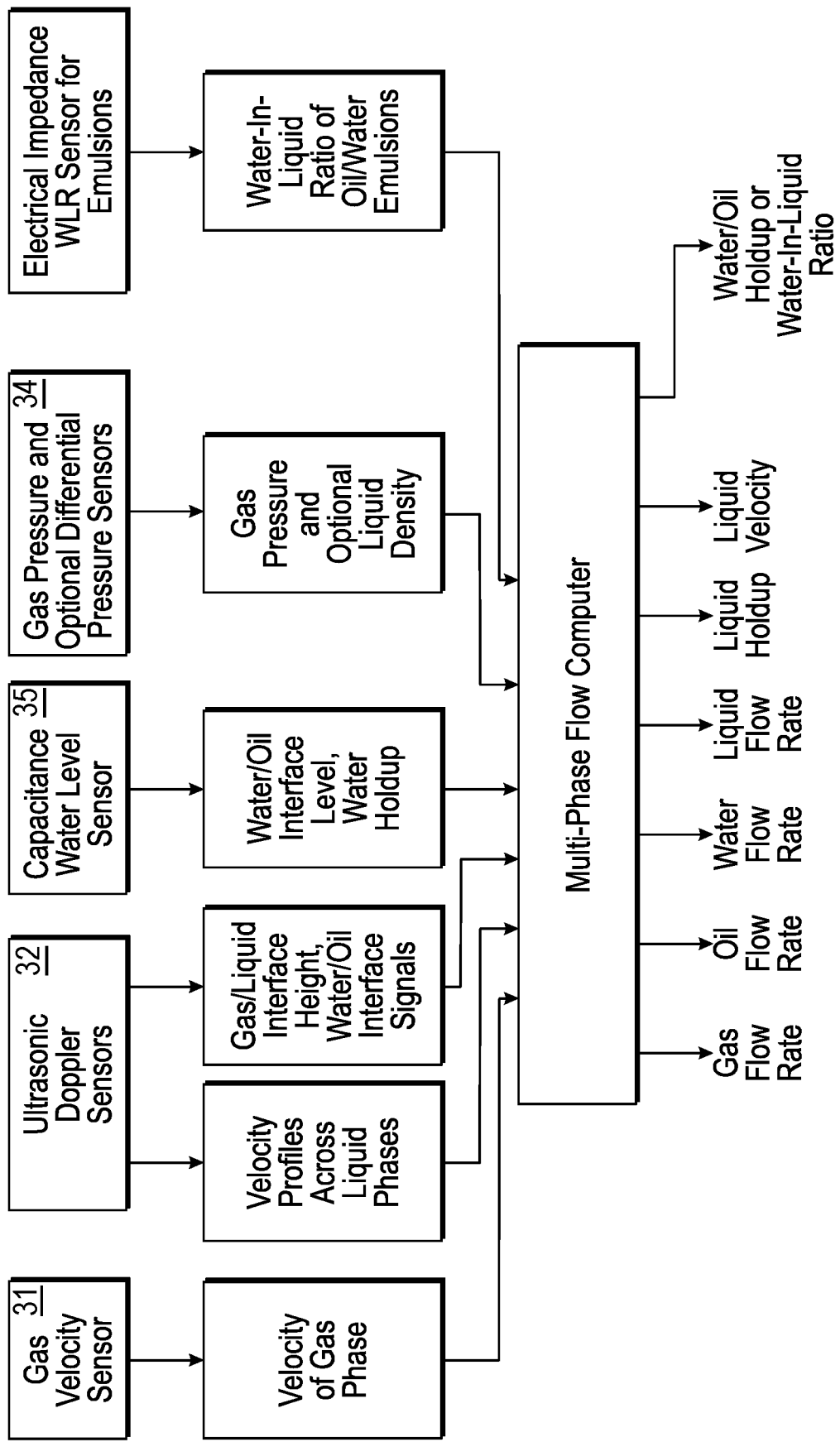
FIG. 6 illustrates example architecture of a multiphase flow measurement system adapted to meter stratified gas/oil/water three-phase flows in oilfield pipes—based on a combination of a gas velocity sensor/measurement-system, ultrasonic Doppler liquid flow sensors, capacitance water level sensor, gas pressure sensor, as well as additional sensors such as DP liquid density sensor and electromagnetic based WLR sensors to add redundancy and to cope with special situations such as oil/water emulsions in the liquid phase, in accordance with some embodiments of the present disclosure.

FIG. 6 shows the architecture of the flow measurement system embodiment described above. This is a multiphase flow measurement system specifically adapted to the metering of stratified gas/oil/water three-phase flows in oilfield pipes. The essential configuration combines a gas velocity sensor 31 or gas flow measurement system, a gas pressure sensor 34 for line condition monitoring, a number of ultrasonic Doppler liquid flow sensors 32, which provide liquid holdup, velocity and flow rate measurement, a capacitance water level sensor 35, which provides the water holdup. Outputs from these sensors/sub-systems are combined in a computation unit to derive the flow rate of oil, gas and water. Additional sensors/subsystems such as a DP liquid density sensor, a liquid sampling and WLR measurement subsystem and/or an electromagnetic based WLR sensor can be added to different locations as illustrated in FIG. 1, in order to add measurement redundancy and to cope with special situations such as oil/water emulsions in the liquid phase. These additional or optional sensors and subsystems are further discussed in the following section.

Other WLR measurement methods may be used in accordance with some embodiments of the present disclosure.

For example, in the case of an emulsion, a liquid sample may be drawn from a liquid rich region in the meter, see FIG. 1, via a liquid sample line and the WLR may be measured by an on line WLR sensor, e.g. based on electromagnetic principles, or densitometers, or by an off-line WLR analyzer.

For another alternative WLR measurement, the differential pressure of $\Delta P = P2 - P1$, as shown in FIG. 1, can be used in combination with the gas/liquid interface height, $h_l$, measured by the ultrasonic liquid sensors, to derive the water holdup in liquid. Since:

$$\Delta P = \rho_{mix} \cdot g \cdot h_l \quad (16)$$

where: $\rho_{mix}$ is the average density of the liquid phase. If the liquid is an oil/water emulsion, then $$\rho_{mix} = (WLR) \cdot \rho_w + (1-WLR) \cdot \rho_o \quad (17)$$

where: $\rho_w$ is the density of water and $\rho_o$ that of oil, which can be determined by sampling and calibration. By combining Eq. (16) and (17), one obtains $$WLR = \frac{\Delta P - \rho_o \cdot g \cdot h_l}{g \cdot h_l \cdot (\rho_w - \rho_o)} \quad (18)$$

If oil and water are separated into two different layers, the $\Delta P$ may be combined with the measured ultrasonic time of flight, T, between the pipe wall and the gas/liquid interface to derive the thickness of the water layer, $h_w$, and that of oil, $h_o$. The relationship between T, $h_w$, and $h_o$ is given by $$T = 2\left(\frac{h_w}{c_w} + \frac{h_o}{c_o}\right), \quad (19)$$

where: $c_w$ and $c_o$ are speed of sound values for water and oil, which are known.

Also Eq. (16) can be rewritten as $$\Delta P = \rho_w g h_w + \rho_o g h_o, \quad (20)$$

where: g is the gravitational constant; $\rho_w$ and $\rho_o$ are also known. Therefore from the two measurements, T and $\Delta P$, the two unknown thickness values can be obtained by solving equations (19) and (20) together.

Figure 7A:
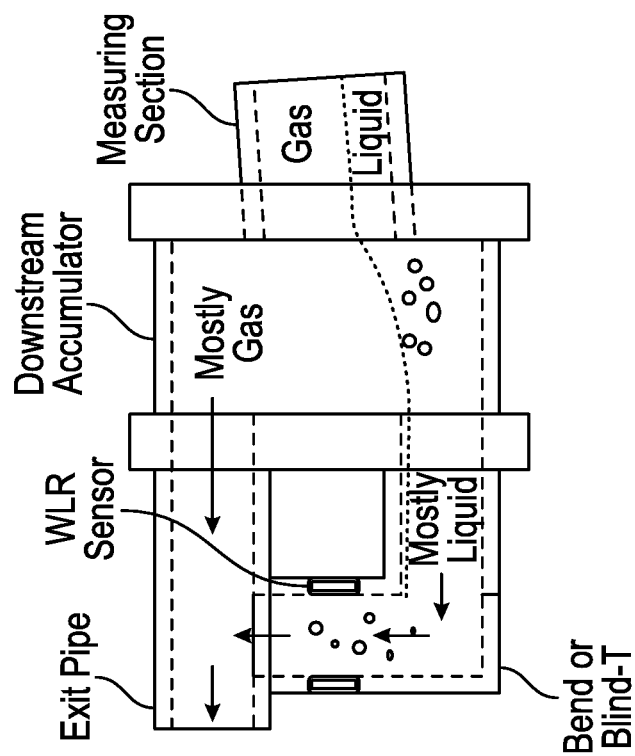
FIGS. 7A and 7B illustrate alternative methods of WLR measurement, including.
Figure 7B:
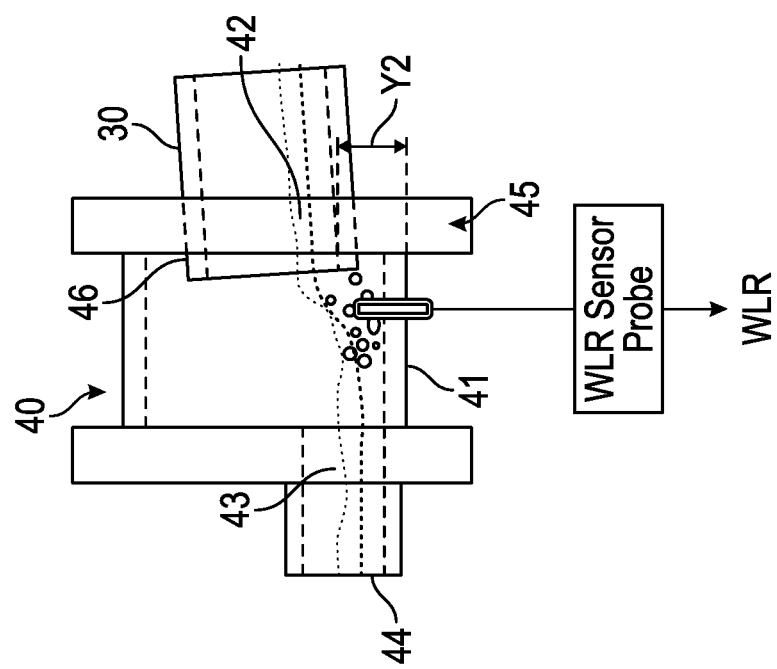

A further method for WLR determination is to use an electromagnetic based water fraction sensor, which may be deployed at a region where water and oil mix well together. Examples are shown in FIGS. 7A and 7B. In FIG. 7A, the expansion after the test section provides an oil/water mixing zone where an EM sensor based on electrical impedance, inductance, or microwave can be used to measure the WLR. In FIG. 7B, a modified design of the downstream flow conditioner creates a liquid rich vertical leg where a water content sensor can be mounted to measure a well-mixed vertical oil/water flow. Since in a vertical flow the water and oil distribution should be more uniform than in a horizontal one, a WLR or water content sensor, whether measuring locally or encompassing the entire pipe cross section, produces a more representative result.

Specifically, in FIG. 7B, a downstream accumulator 40 of a flow multiphase flow measurement system includes a flow straightener 46 adjacent the downstream accumulator inflow orifice 42 so as to condition the flow entering the downstream accumulator 40 in order to condition the flow within the measurement vessel 30 and promote stratified flow. The flow straightener 46 includes one or more tertiary flat plates mounted in parallel with respect to each other and extending either vertically or horizontally. The flat plate-like portion of the tertiary plates is aligned with the normal to the downstream accumulator inflow orifice 42 in order to straighten the fluid inflow. One or more parallel quaternary flat plates are provided in the flow straightener rotated with respect to the tertiary flat plates, with the angular offset between the tertiary and quaternary flat plates being 90°+/−5°.

As alternatives to transit time based ultrasound gas velocity measurement discussed above, other type of velocity sensors can be mounted at the upper part of the measuring vessel 30 to measure a velocity of the gas phase. These may include one or plural thermal probe(s), Pitot tube(s), spinner or turbine meter(s), a vortex shedding based flowmeter, as shown by FIGS. 8A to 8C.

Figure 4C:
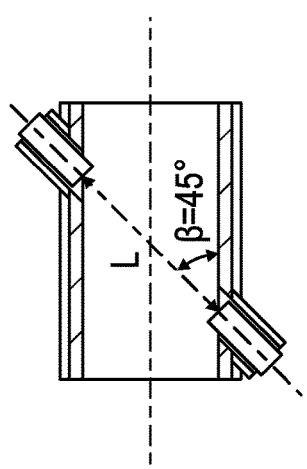
FIG. 4C shows a top view of a measurement vessel taken along line A-A' of FIG. 4A.
Figure 4B:
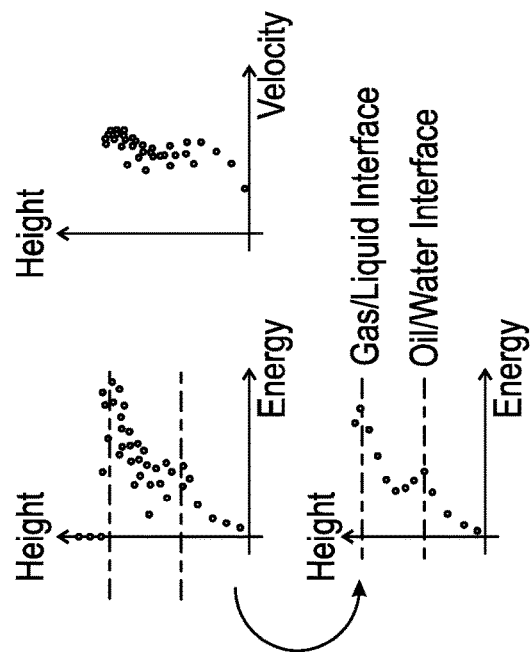
FIG. 4B shows measured velocity and energy profiles in the liquid phase from the range-gated Doppler measurement sensor array of FIG. 4A, and the derivation of the gas/liquid and oil/water interfaces from such profiles.
Figure 4A:
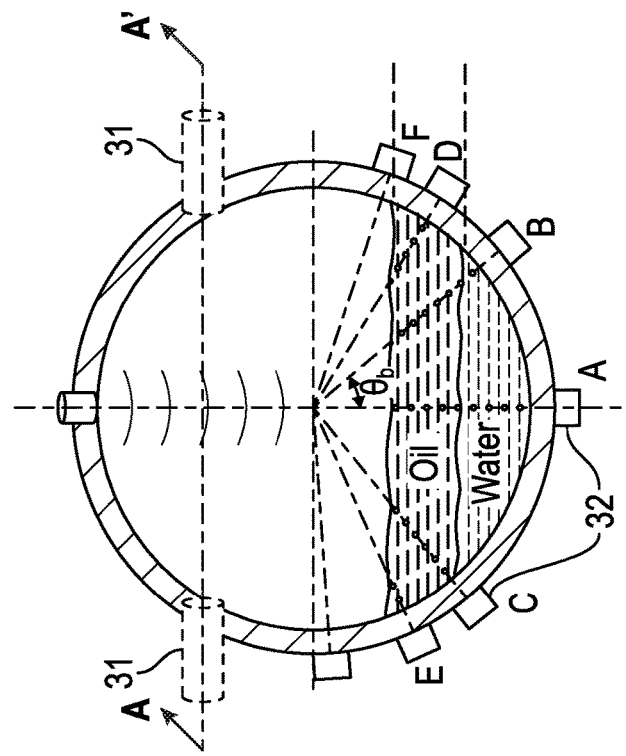
FIG. 4A illustrates a cross-sectional view of ultrasonic gas and liquid measurement sensors, and an additional ultrasonic sensor for through-gas measurement, for use in a flowmeter in accordance with some embodiments of the present disclosure.

Alternative ways of measuring the gas/liquid interface height may include the use of a dipstick type of sensor, based on heat transfer or guided ultrasonic wave, such as Lamb waves, which covers the vertical height of the pipe, or a non-contact ultrasonic transducer mounted on the top side of the pipe, see FIGS. 1, 4A, & 4C. For non-contact measurement, the ultrasonic transducer must have its acoustic impedance matched to that of gas, allowing sufficient ultrasonic energy to be transmitted through the gas layer to reach the gas/liquid interface below. A pulse-echo round-trip travel time from the transducer to the gas/liquid interface, $T_g$, is measured and the liquid layer thickness, $h_1$, is determined by $$h_l = D - T_q \cdot c_q / 2 \quad (21)$$

where: D is the diameter of the measurement vessel 30 and $c_g$ the speed of sound in the gas phase, which is obtained by the transit time gas velocity measurement system as shown by Eq. (10).

In some embodiments of the present disclosure, three-phase fluid sampling and fluid property measurements are also possible. The upstream conditioner 2 naturally provides a three phase separator, or a gas/liquid separator in case of an emulsion.

FIG. 9 shows a phase sampler which can be run in parallel with an interface level sensor to selectively sample the water, oil and gas phases. The interface level sensor can be based on ultrasonic pulse echo sensor or a multi-electrode capacitance dip stick. The sampler that consists of multiple sampling tubes has multiple inlets arranged along the vertical heights. By using the information about the vertical distribution of the three phases obtained with the interface level sensor, appropriate valves can be operated to draw samples from the inlets at appropriate heights.

In some embodiments of the present disclosure, fluid property sensors, such as water conductivity/salinity, liquid viscosity, density, gas composition sensors can also be installed on the mini-separator to measure the required properties. The water conductivity/salinity measurement will be particularly useful as a calibration means for electromagnetic based WLR sensors, particularly in cases of measuring water continuous emulsions where the sensor output is always affected by both the WLR and the water conductivity. In embodiments of the present disclosure, a water property measuring sensor may be installed to access a water rich region in the meter, e.g. near the underside of the upstream accumulator 2 in FIG. 1. An electrical conductivity sensor of a suitable type, such as those based on microwave, direct-contact electrodes, or eddy current principles, can be used in combination with a measured liquid temperature to measure/derive the water salinity.

In some embodiments of the present disclosure, the flow conditioner design shown in FIG. 1 is based on a section of straight pipe with a relative large diameter. Other forms of pipe systems such as T-pieces and cross pieces may also be used to increase the accumulation volume. The orientation of the transverse branch or branches, in a T-piece or a cross-piece, can be changed according to applications, although the two branches of a cross are shown as horizontally oriented in FIG. 10B. The transverse branches can accommodate fluids diverted into them, thus increasing the residence time of the fluids in the accumulator before they eventually flow out into the measuring section.

The system shown in FIG. 1 has been tested on a three-phase flow loop. The results of the tests show that for embodiments of the present invention the gas and liquid of a multiphase flow are well separated in a stratified flow though the flowmeter. Separation between oil and water is also achieved. The stratification of oil and water layers can be achieved by further modification of the slug-catcher and measuring section geometries. The preliminary liquid and gas flow rate measurement results are shown in FIGS. 11, 12A, and 12B.

The pressure drop of the flowmeter was also measured in the flow loop tests and the results are shown in FIGS. 13A and 13B. The maximum loss across the flowmeter at the top range of the flow rate is about 0.02 bar.

Certain preferred advantages of the system in accordance with embodiments of the present invention are:
Near horizontal installation—generating inclined/stratified flow from slug flows at input
  Phase separation over a wide range of flow rates and GVFs
  Downwardly inclined flow amplifies the oil layer thickness—accuracy of $Q_{oil}$ measurement
  No ups/downs & bends that is associated with a vertical meter—cost/pressure drop
  Low pressure drop (no more than 0.5 psi shown in our test)
Clamp-on ultrasound array for liquid flow—Doppler digital scan
  No windows—clamp directly onto steel pipe
  Circumferential digital mode (no calibration needed)
  Tolerate to gas bubbles in liquid
  Does not need to know speed of sound accurately
  Instantaneous liquid holdup &flow rate signals
  WLR capability when oil/water separates—interface detection
  WLR capability when oil/water is mixed—with acoustic/electrical impedance measurements
Ultrasonic gas velocity measurement on separate part of pipe
  High turn down ratio
  Non-intrusive transducers flush mount to the pipe wall
  Mature measurement technique, commercial systems available
Capacitance water level/holdup sensor 35—more reliable/accurate water level measurement than ultrasound
Additional measurements—e.g. AP based WLR and electromagnetic based WLR and salinity
Easy to implement sampling devices and fluid property sensors at the upstream and downstream flow conditioners where separated or mixed phases can be found.

Embodiments of the present disclosure may provide among other things a combination of a stratified flow generator with various velocity and phase holdup measurement means to determine the flow rates of the individual stratified phases such as gas and liquid and inside the liquid phase, oil and water, which is a significant advantage over prior arts that do not utilize flow stratification. More specifically this disclosure may provide for combining a stratified gas/liquid and/or gas/oil/water flow generation in a pipe section 7 with some, or all of the following sensor/measurement systems that can measure the flow-related parameters of the individual phases separately—sensors or systems for measurements of:
  gas phase flow velocity,
  liquid phase flow velocity,
  oil phase flow velocity,
  water phase flow velocity,
  liquid phase holdup or gas phase holdup,
  water holdup, or water-in-liquid ratio,
  water conductivity, In some embodiments of the present disclosure, the velocity and holdup measurements may be performed on the same cross-section of the stratified gas/oil/water flow. In some embodiments of the present disclosure, the preferred measurement techniques may include ultrasonic based gas and liquid flow sensors 31, 32, which often can be implemented in no-intrusive installations, as well as capacitance based water level sensors.

Embodiments of the present disclosure may provide for among other things:
Combining a flow conditioning accumulator 2 with a downwardly inclined flow pipe section 7 to achieve sufficient level of phase stratification between gas, oil and water;
Using an upstream flow conditioning volume of appropriate size (e.g. greater than the average liquid slug size), which provides sufficiently large cross-sectional expansion to the input flow; in the case of a circular cross-section, the diameter of the accumulator 2 is preferably greater than at least 2 times that of the input pipe 5, in order to produce significant slowdown to the input flow and enhance gas/liquid separation inside the accumulator—standard pipe pieces including T-pieces, cross-pieces can be used to provide the accumulator volume.
For a typical upstream flow conditioner/accumulator 2, using a flow direction diverter/phase distributer 10 near the entrance and a flow resistance device 20 near the exit to reduce mixing between the phases, enhance phase separation as well as slug smoothing effect and reduce flow rate fluctuation in the measurement section; use of a laminated stack design (with plates in vertical 21, horizontal 23 orientation or a combination of both) for the resistive device 20, which can be installed at one or both ends 51, 52 of the measuring pipe section 7, serving as flow straighteners.

Creating a downwardly inclined flow in a pipe, on which phase holdup, velocity and flow rate measurements are performed, with a suitable inclination angle, preferably between 0 and 75 degrees, even more preferably between 0 and 5 degrees.

Choosing appropriate diameter, d3, for the measurement section pipe 7, e.g. preferably greater than that of input pipe 5, so that a satisfactory degree of stratification is maintained inside the measurement section, with preferred pipe length of 3 to 20 times of d3.

Using different cross-section from circular may be used for the metering pipe 7 section, including square and rectangular shapes.

Locating the flow entry to the upstream accumulator 2 towards to the lower side of the accumulator 2, preferably align the bottom of the input pipe 5 bore so that it is below the gas/liquid and oil/water interface inside the accumulator 2.

Using a downstream flow conditioner 40 to reduce back flow effect and ensure a satisfactory degree of stratification inside the measurement section—preferably, the downstream conditioner 40 sets appropriate vertical offsets to the metering section pipe 7 at its inlet and the production pipe interface at its exit, such that the gas/liquid interface level near the downstream end of the metering section is higher than the top of the exit pipe—this minimizes back flow into the metering section.

Using flow straighteners 20 at either end or both ends of the inclined measurement pipe section 7, to condition liquid and gas flows.

Embodiments of the present disclosure may provide among other things for:

A liquid holdup, velocity and flow rate measurement system based on clamp-on ultrasonic transducers 31, 32 around the pipe 7, performing range-gated Doppler measurements (prior art [4]), which allow the derivation of the holdups of gas, oil and water and of the velocities of oil and water, primarily by identifying the interface between gas and liquid phase and that between oil and water, measuring the velocity profiles inside the oil and water layers and integrate these profiles to derive the flow rates of oil and water; other ultrasonic interface and velocity measurement methods may also be used instead of the Doppler, which may include pulse-echo measurements to measure the interface heights and time of flight method or cross-correlation method to measure flow velocity.

A water level sensor 35 based on a capacitance principle that utilizes one insulated conductor in a dipstick or dip-ring like configuration, measures the capacitance between the said conductor (electrode 1) and the conductive water phase (electrode 2) and utilizes the relationship between water immersed length of electrode 1 and the measured capacitance value to derive water layer thickness and water holdup.

A gas velocity and speed of sound measurement system based on an ultrasonic transit time measurement performed along a suitable path across the gas layer, primarily across the upper part of the pipe cross-section; alternative gas velocity measurement sensors such as turbines, V-cone flowmeters, Piton tubes, etc. can be used instead of the afore mentioned ultrasonic method Combining the measured gas cross-sectional area in and the gas velocity as well as measured gas temperature and pressure to produce the gas flow rate.

Combining ultrasonic measurements with sensors based on other physical principles to measure a liquid phase comprising an oil/water emulsion in a stratified gas/liquid flow, including:

Determining the WLR of the liquid by measuring the acoustic impedance of the liquid using clamp-on ultrasonic leaky wave sensors;

Combining the measured liquid interface level with a differential pressure measurement, made between the topside and the underside of the measurement pipe section, to derive the WLR; or Using a liquid sample line to extract a liquid sample at a liquid rich region inside the flowmeter pipe work, and using a WLR sensor (e.g. densitometer or dielectric based) mounted on the sample line to measure and derive the WLR Using gas, liquid, water, oil sample lines in combination with an interface level measurement sensor to extract samples of separated phases from the upstream flow conditioner/accumulator.

Using fluid property sensors such as water conductivity sensor to measure the properties of the separated phases.

Additional WLR probe at the downstream flow conditioner, measuring liquid in a region of good mixing between oil and water, or additional WLR sensor on a vertical leg downstream of the said conditioner to measure WLR, and combining with measured water conductivity to derive correct WLR.

A liquid sampling device with inlet in the downstream conditioner to sample fluids in the mixing zone created by a hydraulic jump towards the outlet of the conditioner; derive WLR from such samples.

Combining the WLR measured with the measured liquid flow rate to determine the oil and water flow rates In some embodiments of the present disclosure, additional measurements may comprise:

An ultrasonic transducer mounted on the topside of the measurement pipe section 7, which transmits ultrasonic pulses across the gas layer to measure the gas/liquid interface level and possibly the interface velocity, A water salinity measurement cell/sensor with access to the water rich region inside the meter pipe work, which measures the water conductivity and derives the salinity Liquid sampling capability to obtain samples, mixture or separated phases, for offline analysis In some embodiments of the present disclosure an overall measurement system architecture may combine all the measurements listed above in a computation unit to derive flow rate of oil, water and gas and other parameters as seen in FIG. 6.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the scope of the present disclosure.

The invention claimed is:

1. A conditioning accumulator for a multiphase flow measurement system, the conditioning accumulator comprising:
a container, wherein the container comprises:
sidewalls;
an inflow orifice in a first sidewall of the sidewalls for receiving an end of an inflow pipe and an outflow orifice in a second sidewall of the sidewalls for receiving an end of an outflow vessel;
a phase distributer located appurtenant to the inflow orifice and configured to distribute liquid and gas phases of an incoming flow of a multiphase mixture from the inflow pipe within the container; and
an exit flow resistance device located appurtenant to the outflow orifice and configured to reduce or resist outflow of liquid from the container and thereby smooth out flow rate impulses.

2. The conditioning accumulator of claim 1, wherein a lowest point of the inflow orifice is at or near the bottom of the container and a lowest point of the outflow orifice is vertically offset and above the lowest point of the inflow orifice when the container is in its operational orientation.

3. The conditioning accumulator of claim 1, wherein a distance between the sidewalls is longer than an average diameter of a cross section of the container.

4. The conditioning accumulator of claim 1, wherein an average cross section of the container is greater than both an average cross section of the outflow vessel and an average cross section of the inflow pipe.

5. The conditioning accumulator of claim 1, wherein the phase distributer comprises:
a pipe having a size and shape matching that of the inflow orifice in the container;
one or more first slots provided along the length of the pipe extending through a pipe wall to fluidly connect an inside of the pipe with an outside of the pipe, wherein the one or more first slots are located at sides of the pipe when the phase distributer is in its operational orientation;
one or more fins located on the outside of the pipe and adjacent and between the one or more first slots, wherein the one or more fins have a larger cross-sectional area than a cross-sectional area of the pipe, and wherein the fins extend away from the outside of the pipe to direct a liquid phase flowing through the pipe outward and away from the pipe; and
one or more second slots provided along the length of the pipe extending through the pipe wall to fluidly connect the inside of the pipe with the outside of the pipe;
wherein the one or more second slots are located at a top of the pipe when the phase distributer is in its operational orientation, the one or more second slots being configured to strip and divert the gas phase to an upper part of the container, and shaped approximately as a "T";
wherein a lower part of the container is in fluid connection with the inside of the pipe and side arms of the "T" are adapted to direct the gas phase outward toward sides of the container.

6. The conditioning accumulator of claim 1, wherein the exit flow resistance device comprises one or more primary flat plates mounted substantially parallel with respect to each other and substantially aligned with a normal to the outflow orifice.

7. The conditioning accumulator of claim 6, wherein one or more substantially parallel secondary flat plates are provided in the exit flow resistance device rotated with respect to the primary flat plates such that an angular offset between the primary and secondary flat plates is 90°+/−5°.

8. The conditioning accumulator of claim 1, wherein the exit flow resistance device comprises a flow straightener having one or more straight holes, wherein the straight holes are aligned with a normal to the outflow orifice.

9. A multiphase flow measurement system comprising:
a conditioning accumulator including a container, the container having:
sidewalls;
an inflow orifice in a first sidewall of the sidewalls for receiving an end of an inflow pipe and an outflow orifice in a second sidewall of the sidewalls for receiving an end of an outflow vessel;
a phase distributer located appurtenant to the inflow orifice and configured to distribute liquid and gas phases of an incoming flow of a multiphase mixture from the inflow pipe within the container; and
an exit flow resistance device located appurtenant to the outflow orifice and configured to reduce or resist outflow of liquid from the container; and
an inclined measurement vessel extending from the outflow orifice and directed away from the container, wherein a first end of the inclined measurement vessel is at the outflow orifice and is positioned higher than a second end of the measurement vessel which is the end of the measurement vessel offset from the outflow orifice, such that the measurement vessel is inclined downwardly from the first end to the second end when in its operational orientation.

10. The multiphase flow measurement system of claim 9, wherein the measurement vessel comprises one or more sensors positioned at a location along the measurement vessel to measure a property of a stratified fluid flow.

11. The multiphase flow measurement system of claim 10, wherein the one or more sensors comprise one or more of:
a) ultrasonic gas flow velocity sensors mounted around or above a central vertical point of the measurement vessel;
b) ultrasonic liquid fraction and velocity sensors mounted around or below the central vertical point of the measurement vessel;
c) temperature sensors; and/or
d) pressure sensors located throughout a vertical height range of the measurement vessel.

12. The multiphase flow measurement system of claim 9, wherein the measurement vessel comprises one or more sensors provided outside the measurement vessel and adapted to be moveably fixed to the outside of the measurement vessel.

13. The multiphase flow measurement system of claim 9, further comprising:
a water level sensor comprising an insulated conductor in a dipstick or dip-ring configuration adapted to measure a capacitance between the insulated conductor and any water in the measurement vessel to determine a height of the water, when present.

14. The multiphase flow measurement system of claim 9, further comprising:
a downstream accumulator located at a lower end of the measurement vessel, the downstream accumulator comprising:
a downstream accumulator container having:
a downstream accumulator inflow orifice for receiving the lower end of the measurement vessel; and a downstream accumulator outflow orifice for receiving an end of an outflow pipe,
wherein a lowest point of the downstream accumulator inflow orifice is positioned vertically offset and above a bottom of a sidewall of the downstream accumulator container and the downstream accumulator outflow orifice is positioned in another or the sidewall of the downstream accumulator container.

15. The multiphase flow measurement system of claim 14, wherein the downstream accumulator further comprises:
a flow straightener adjacent to the downstream accumulator inflow orifice, the flow straightener comprising:
one or more tertiary flat plates mounted substantially parallel with respect to each other and substantially aligned with a normal to the downstream accumulator inflow orifice; and
one or more substantially parallel quaternary flat plates rotated with respect to the tertiary flat plates such that an angular offset between the tertiary and quaternary flat plates is 90°+/−5°.

16. A method for conditioning a multiphase flow mixture for a multiphase flow measurement system, the method comprising:
flowing the multiphase flow mixture into a container of an accumulation vessel through an inflow orifice in a first sidewall of a plurality of sidewalls of the accumulation vessel;
separating liquid and gas phases of the multiphase flow mixture in the accumulation vessel;
flowing the separated liquid and gas phases of the multiphase flow mixture out of the accumulation vessel through an outflow orifice in a second sidewall of the plurality of sidewalls of the container of the accumulation vessel; and
using an exit flow resistance device to reduce or resist flow of the liquid phase of the multiphase flow mixture out through the outflow orifice and thereby smooth out flow rate impulses.

17. The method of claim 16, wherein the outflow orifice is configured in use to be disposed vertically higher in the accumulation vessel than the inflow orifice.

18. The method of claim 16, wherein the exit flow resistance device reduces a flow rate of the liquid phase out of the container to less than a peak flow rate of the multiphase mixture into the container.

19. The method of claim 16, further comprising:
stratifying the flow of the conditioned multiphase mixture by flowing the conditioned multiphase mixture downward though an inclined measurement vessel; and
measuring properties of the stratified flow of the conditioned multiphase mixture in the measurement vessel.

20. The method of claim 19, further comprising:
flowing the stratified flow of the conditioned multiphase mixture out of the inclined measuring vessel into a downstream accumulation vessel.

* * * * *